United States Patent
Maeda et al.

(10) Patent No.: US 11,218,714 B2
(45) Date of Patent: Jan. 4, 2022

(54) IMAGE CODING APPARATUS AND IMAGE DECODING APPARATUS FOR CODING AND DECODING A MOVING IMAGE BY REPLACING PIXELS WITH A LIMITED NUMBER OF COLORS ON A PALETTE TABLE

(71) Applicant: CANON KABUSHIKI KAISHA, Tokyo (JP)

(72) Inventors: Mitsuru Maeda, Tokyo (JP); Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 15/529,460

(22) PCT Filed: Nov. 9, 2015

(86) PCT No.: PCT/JP2015/005597
§ 371 (c)(1),
(2) Date: May 24, 2017

(87) PCT Pub. No.: WO2016/084317
PCT Pub. Date: Jun. 2, 2016

(65) Prior Publication Data
US 2017/0332091 A1    Nov. 16, 2017

(30) Foreign Application Priority Data
Nov. 28, 2014    (JP) .............................. JP2014-242441

(51) Int. Cl.
*H04B 1/66* (2006.01)
*H04N 7/12* (2006.01)
(Continued)

(52) U.S. Cl.
CPC ........... *H04N 19/44* (2014.11); *H04N 19/124* (2014.11); *H04N 19/126* (2014.11);
(Continued)

(58) Field of Classification Search
CPC .......................... H04N 19/124; H04N 19/593
See application file for complete search history.

(56) References Cited

U.S. PATENT DOCUMENTS 5,374,958 A * 12/1994 Yanagihara ......... H01L 41/1132
375/240.04
5,990,957 A * 11/1999 Ryoo ................... H04N 19/176
375/240.03
(Continued)

FOREIGN PATENT DOCUMENTS

JP    2011-217389 A    10/2011
JP    2012-170042 A    9/2012
(Continued)

OTHER PUBLICATIONS

Sole J et al: "Non-CE6: Delta QP signalling for palette", 19. JCT-VC Meeting; Oct. 17, 2014-Oct. 24, 2014; Strasbourg; (Joint Collaborative Team On Video Coding of ISO/IEC JTC1/SC29/WG11 and ITU-T SG.16); URL: http://wftp3.itu.int/av-arch/jctvc-site/,, No. JCTVC-S0043-r2, Oct. 22 (Year: 2014).*

(Continued)

*Primary Examiner* — Fabio S Lima
(74) *Attorney, Agent, or Firm* — Canon U.S.A., Inc. IP Division

(57) ABSTRACT

An image decoding apparatus decodes a bit stream generated by coding an image and decodes coded data included in the bit stream and corresponding to a target block to be decoded in the image. The apparatus includes a first determining unit configured to determine whether the target block is prediction-coded or palette-coded; a second determining unit configured to determine whether or not a pixel in the target block is escape-coded if the first determining unit determines that the target block is palette-coded; and a first decoding unit configured to decode the target block by using a second quantization parameter different from a first quan- (Continued)

tization parameter if the second determining unit determines that the pixel is escape-coded. The first quantization parameter is used to decode the coded data in a case where the first determining unit determines that the target block is prediction-coded.

16 Claims, 13 Drawing Sheets

(51) Int. Cl.
<table>
<tr><td>H04N 11/02</td><td>(2006.01)</td></tr>
<tr><td>H04N 11/04</td><td>(2006.01)</td></tr>
<tr><td>H04N 19/44</td><td>(2014.01)</td></tr>
<tr><td>H04N 19/157</td><td>(2014.01)</td></tr>
<tr><td>H04N 19/182</td><td>(2014.01)</td></tr>
<tr><td>H04N 19/593</td><td>(2014.01)</td></tr>
<tr><td>H04N 19/70</td><td>(2014.01)</td></tr>
<tr><td>H04N 19/146</td><td>(2014.01)</td></tr>
<tr><td>H04N 19/176</td><td>(2014.01)</td></tr>
<tr><td>H04N 19/126</td><td>(2014.01)</td></tr>
<tr><td>H04N 19/124</td><td>(2014.01)</td></tr>
</table>

(52) U.S. Cl.
CPC ......... *H04N 19/146* (2014.11); *H04N 19/157* (2014.11); *H04N 19/176* (2014.11); *H04N 19/182* (2014.11); *H04N 19/593* (2014.11); *H04N 19/70* (2014.11)

(56) References Cited

U.S. PATENT DOCUMENTS

| | | | | |
|---|---|---|---|---|
| 6,259,810 B1* | 7/2001 | Gill | ............ | G06T 9/005 |
| | | | | 358/539 |
| 7,400,588 B2* | 7/2008 | Izzat | ............ | H04L 47/10 |
| | | | | 370/252 |
| 2011/0200115 A1* | 8/2011 | Hayashi | ............ | H04N 19/61 |
| | | | | 375/240.24 |
| 2012/0114034 A1* | 5/2012 | Huang | ............ | H04N 19/70 |
| | | | | 375/240.03 |
| 2013/0294524 A1* | 11/2013 | Van Der Auwera | ... | H04N 19/70 |
| | | | | 375/240.18 |
| 2014/0270558 A1* | 9/2014 | Watanabe | ............ | H04N 19/70 |
| | | | | 382/239 |
| 2014/0348227 A1* | 11/2014 | Lee | ............ | H04N 19/463 |
| | | | | 375/240.03 |
| 2014/0362798 A1* | 12/2014 | Shu | ............ | H04L 1/1854 |
| | | | | 370/329 |
| 2014/0362904 A1* | 12/2014 | Lim | ............ | H04N 19/91 |
| | | | | 375/240.02 |
| 2015/0172661 A1* | 6/2015 | Dong | ............ | H04N 19/13 |
| | | | | 375/240.03 |
| 2015/0365671 A1* | 12/2015 | Pu | ............ | H04N 19/117 |
| | | | | 375/240.03 |
| 2016/0007038 A1* | 1/2016 | Chou | ............ | H04N 19/40 |
| | | | | 375/240.03 |
| 2017/0332091 A1* | 11/2017 | Maeda | ............ | H04N 19/146 |

FOREIGN PATENT DOCUMENTS

| JP | 2014-116733 A | 6/2014 |
|---|---|---|
| WO | 2014/165784 A1 | 10/2014 |

OTHER PUBLICATIONS

Sole, et al., "Non-CE6: Delta QP signalling for palette", Joint Collaborative Team on Video Coding (JCT-VC) of ITU-T SG 16 WP 3 and ISO/IEC JTC 1/SC 29/WG 11, 19th Meeting, JCTVC-S0043-r2, Oct. 17-24, 2014.

Joshi, et al., "Screen Content Coding Test Model 2 (SCM 2)", MPEG Meeting, International Organization for Standardization Organisation Internationale De Normalisation ISO/1EC JTC1/SC29/WG11 Coding of Moving PICTUttS And Audio ISO/1EC JTC1/SC29/WG11, No. N14706, Jul. 2014, Sapporo, Japan.

Rosewarne, et al., "HEVC Range extensions test model 7 encoder description", Joint Collaborative Team on Video Coding (JCT-VC) of ITU-T SG 16 WP 3 and ISO/IEC JTC 1/SC 29/WG 11, 17th Meeting, Apr. 2014, Valencia, ES, No. N14418, JCTVC-Q1013.

Xiaoyu Xiu, et al., "Description of Screen Content Coding Technology Proposal by InterDigital", Joint Collaborative Team on Video Coding (JCT-VC) of ITU-T SG16 WP3 and ISO/IEC JTC1/SC29/WG11, 17th Meeting, Valencia, ES, Mar. 27-Apr. 4, 2014, pp. 1-32.

* cited by examiner

[Fig. 1]
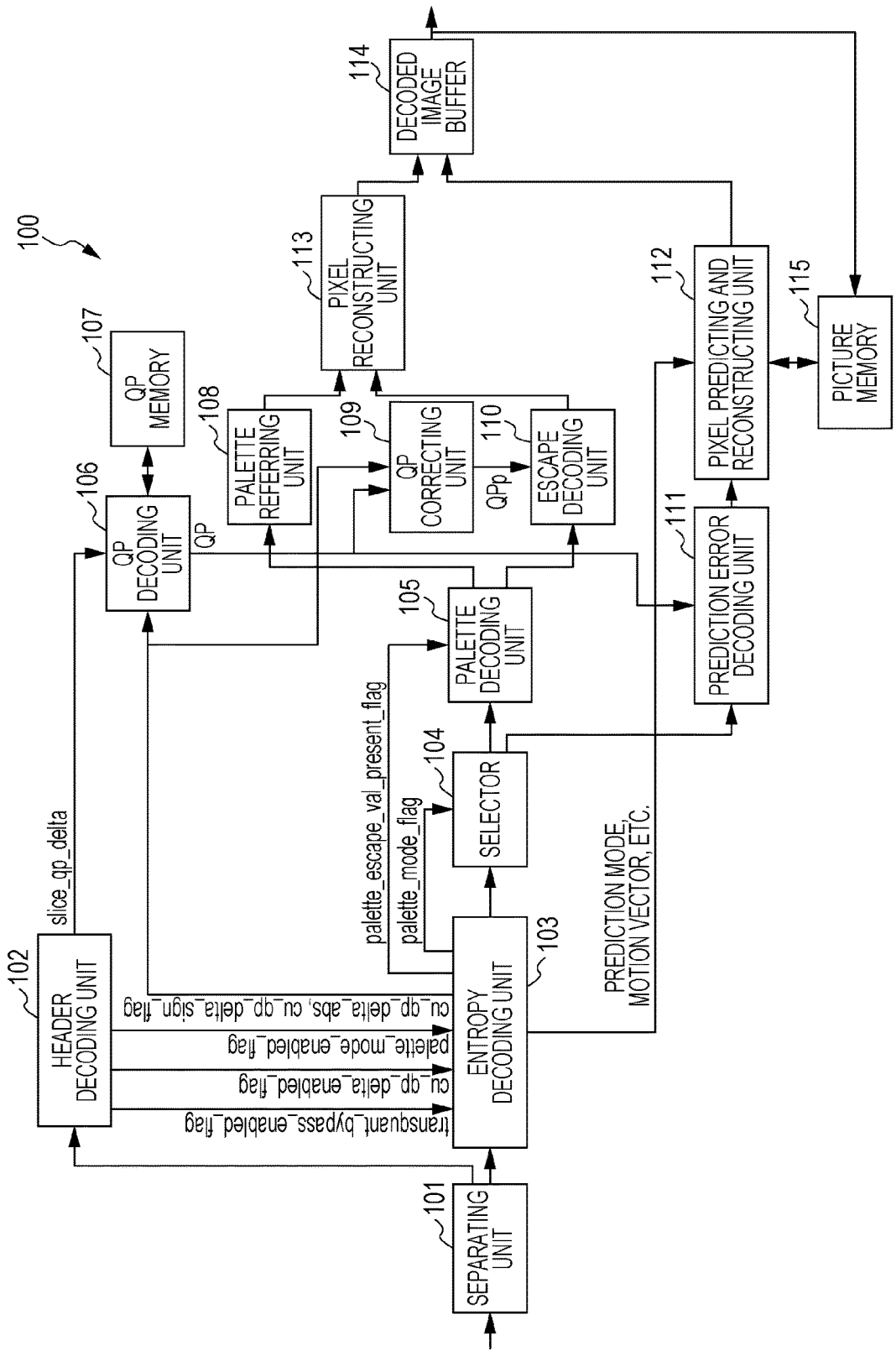

[Fig. 2A]
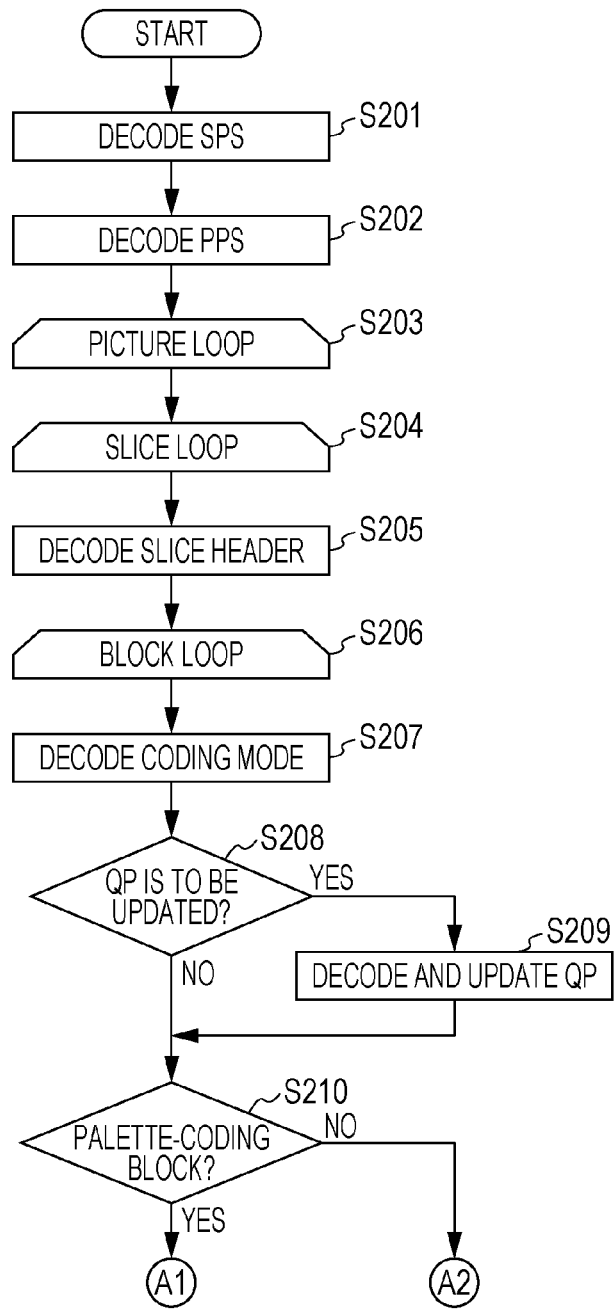

[Fig. 2B]
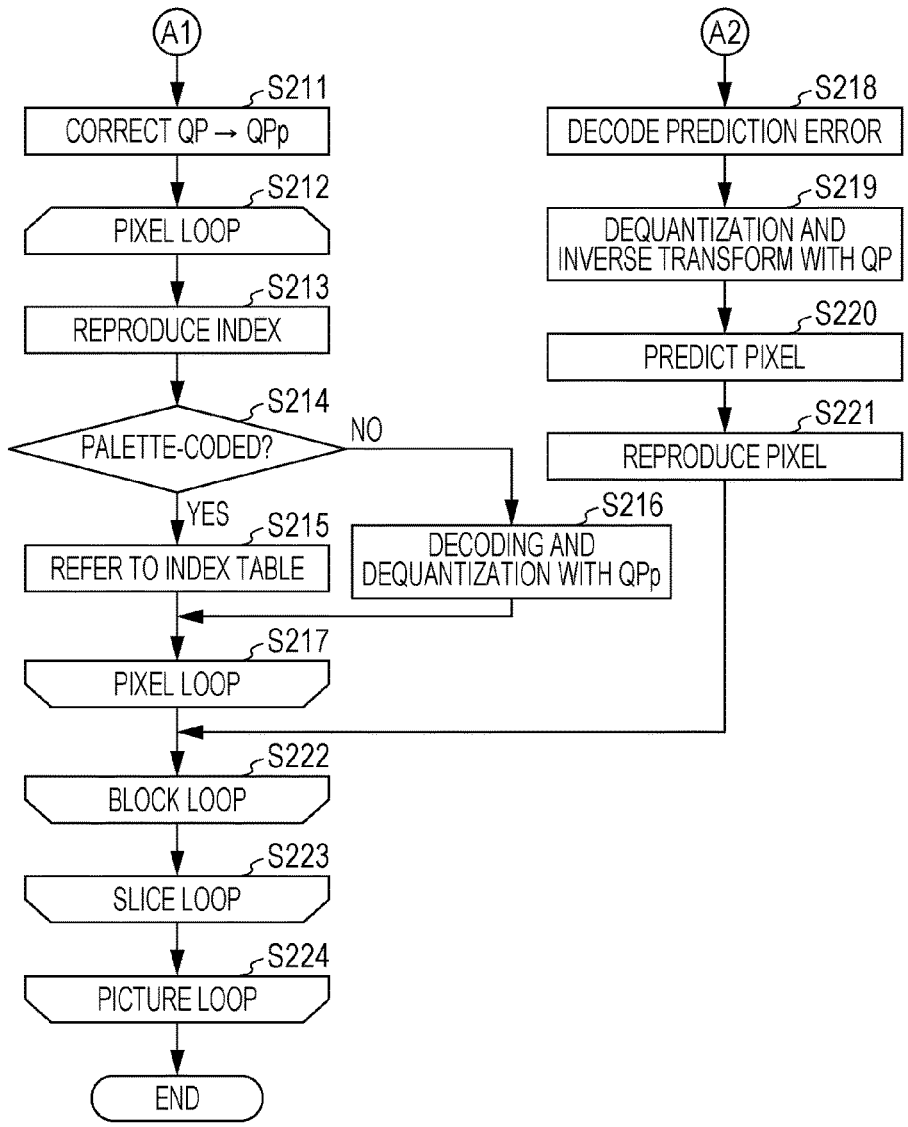

[Fig. 3]
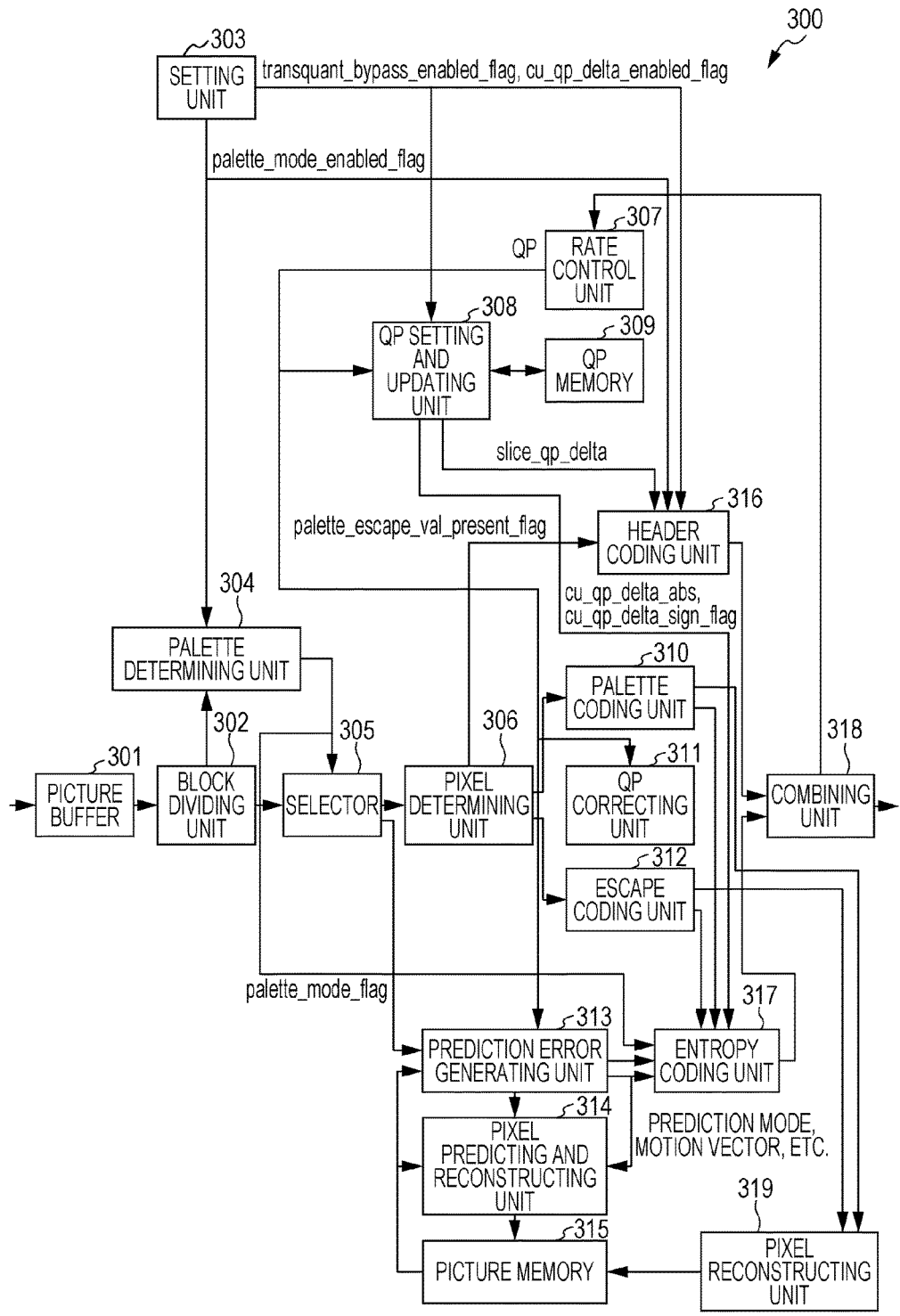

[Fig. 4A]
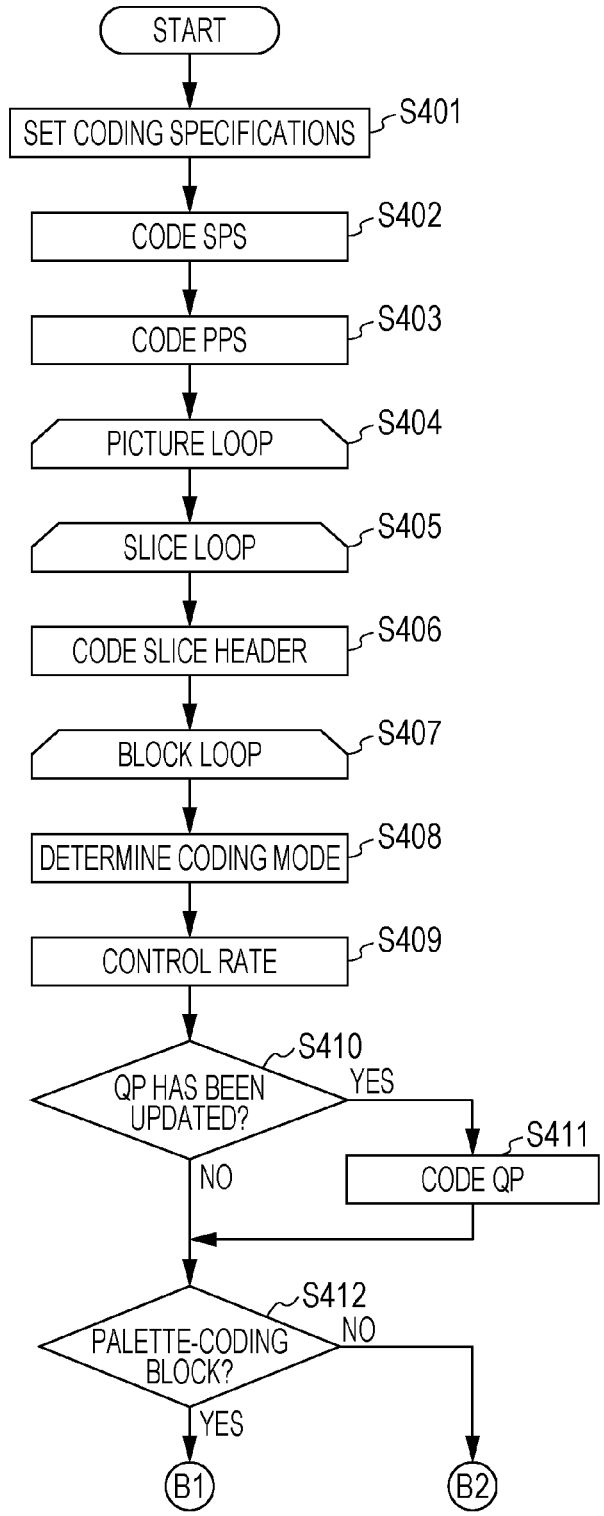

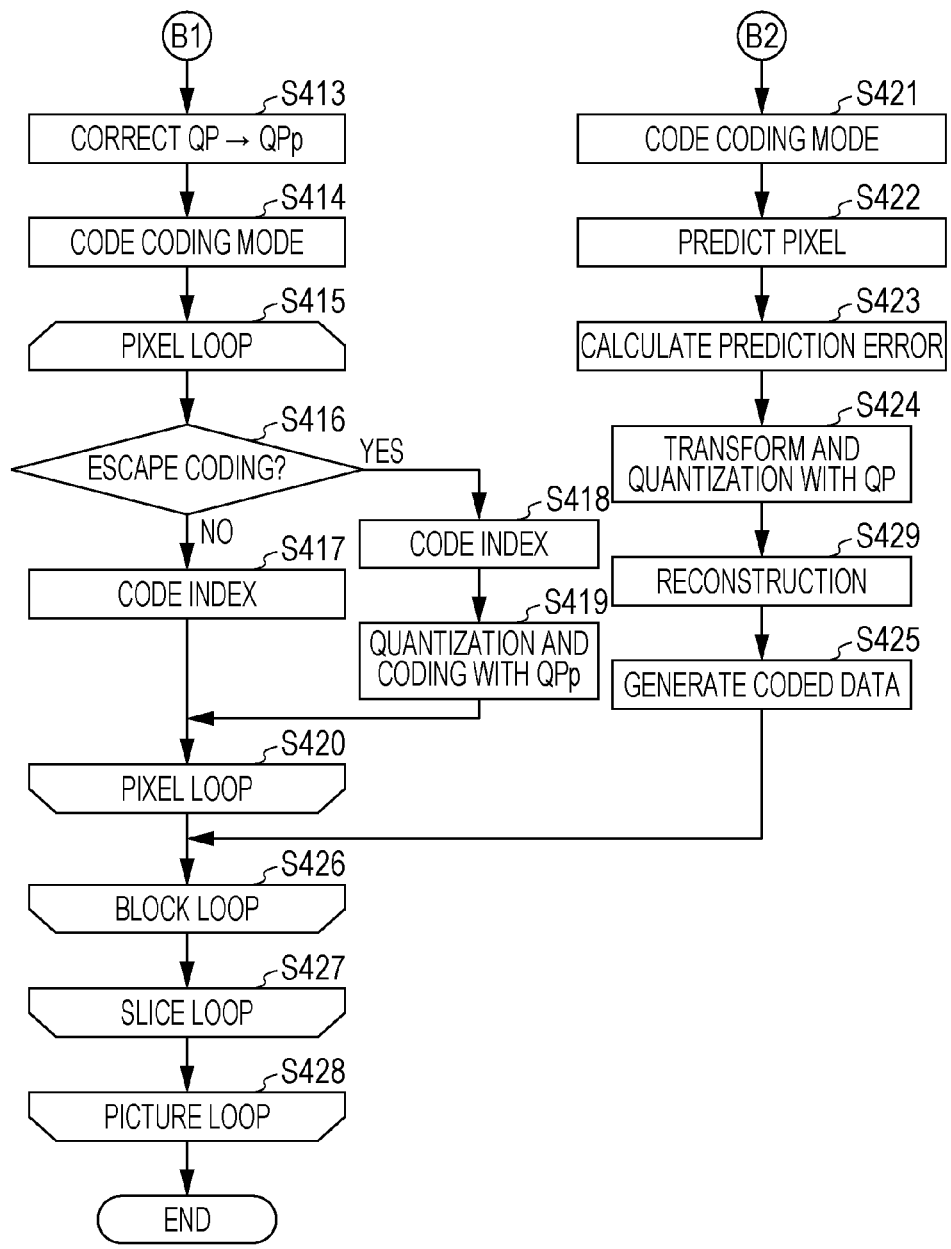
[Fig. 4B]

[Fig. 5A]
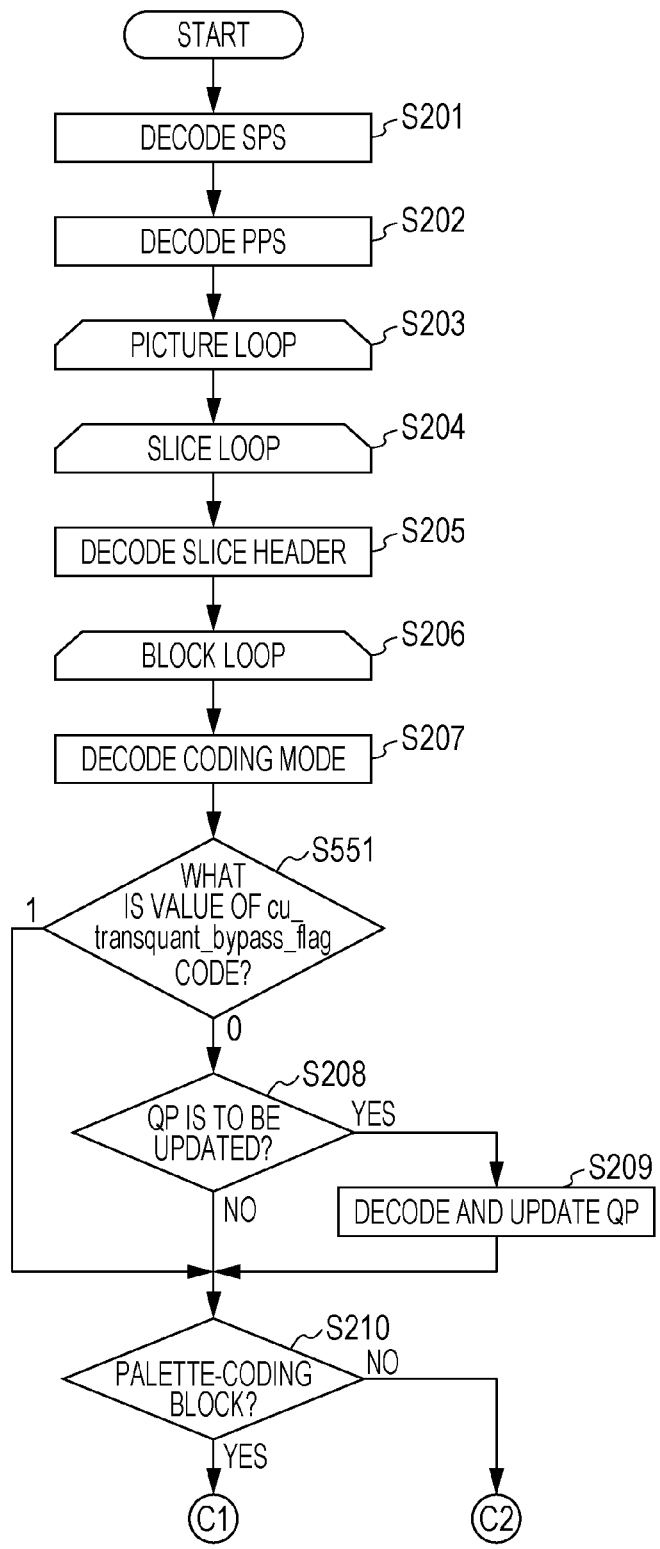

[Fig. 5B]
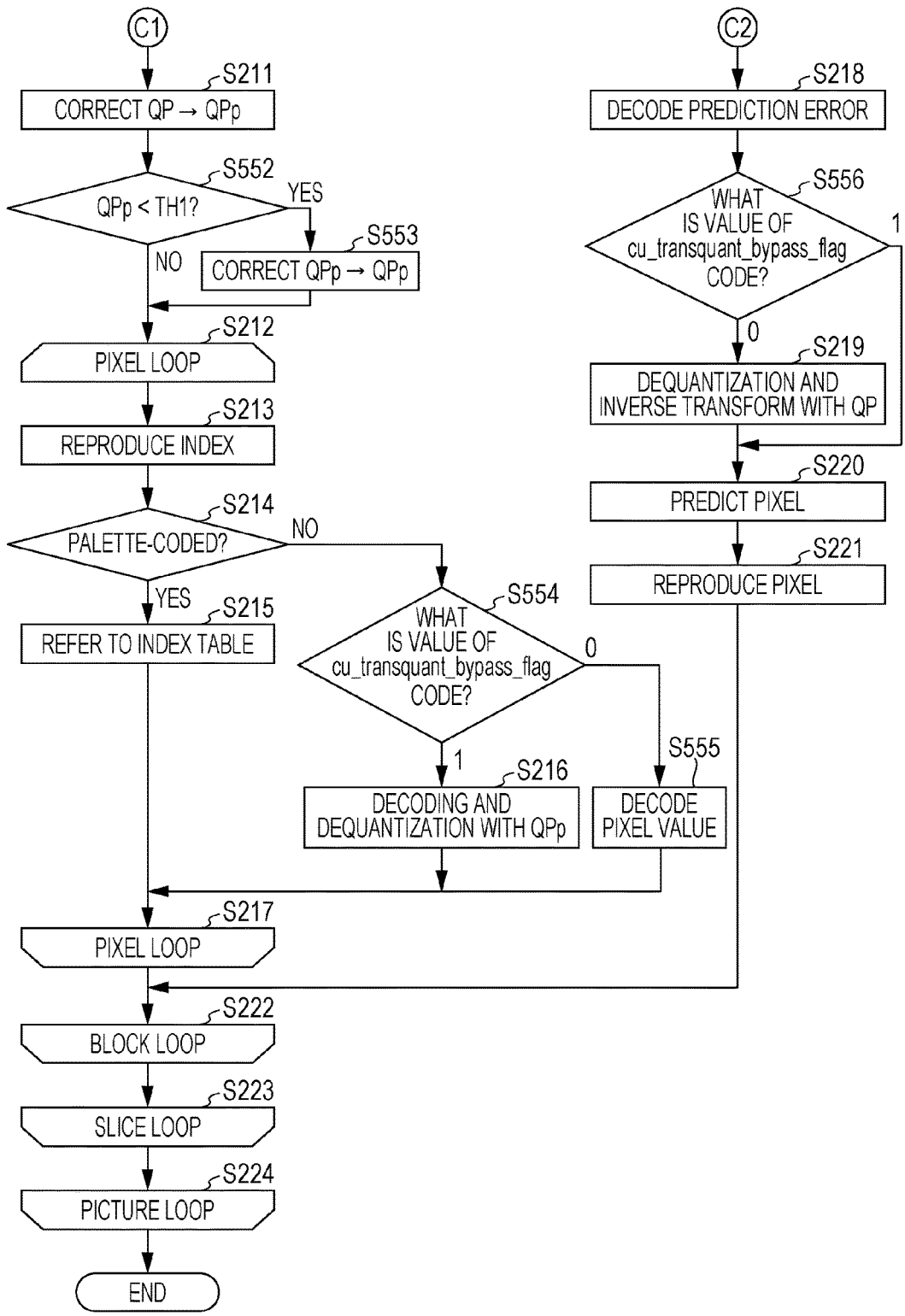

[Fig. 6A]
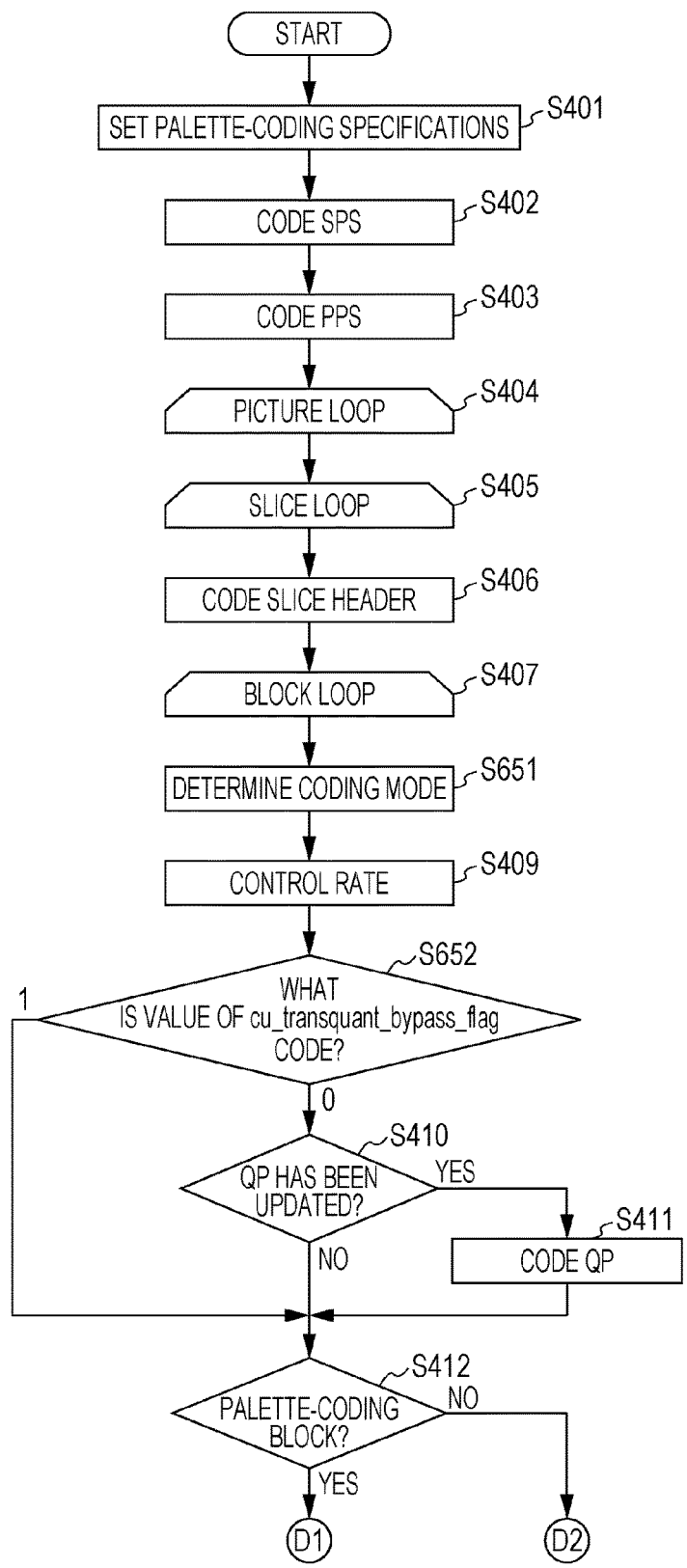

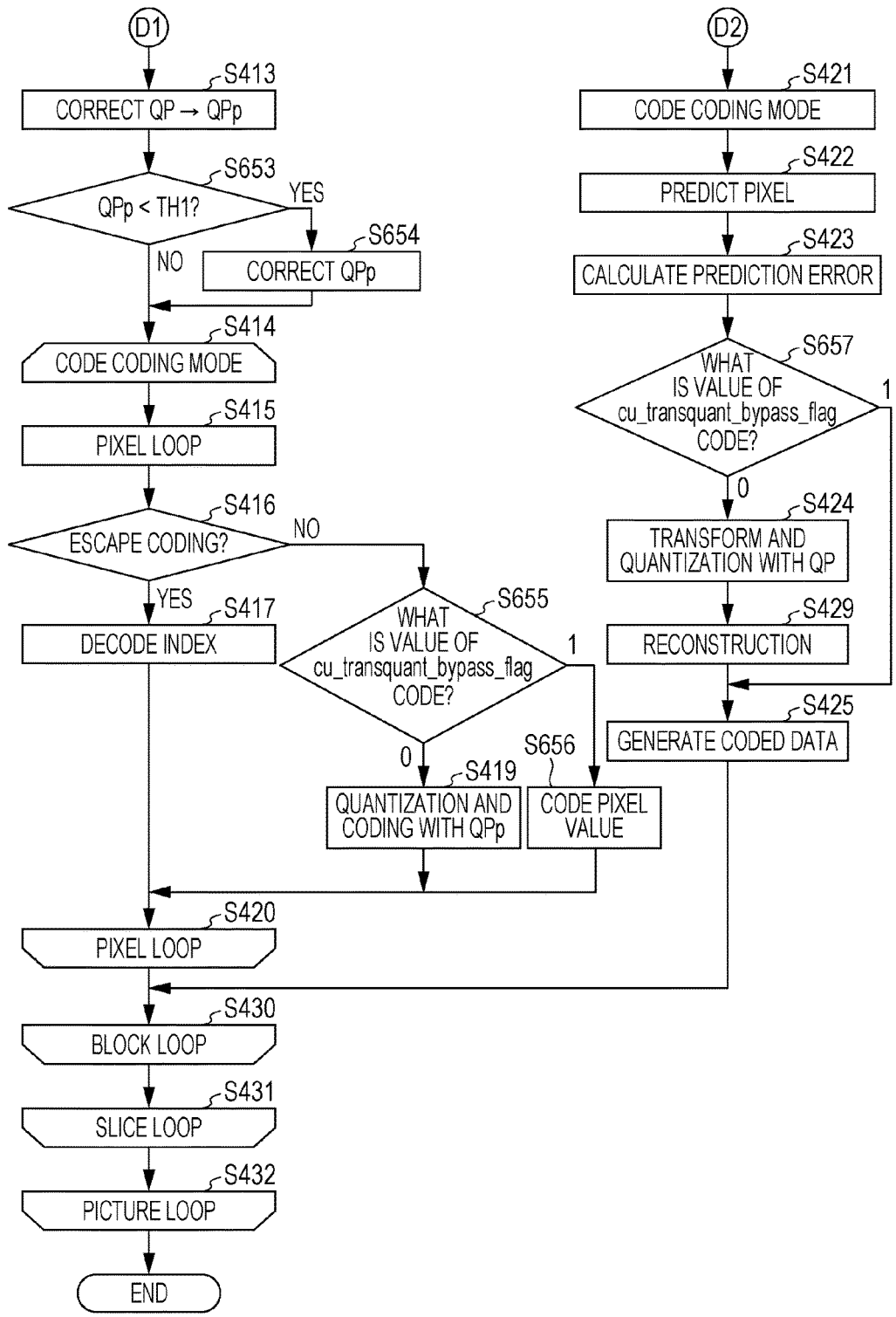
[Fig. 6B]

[Fig. 7]
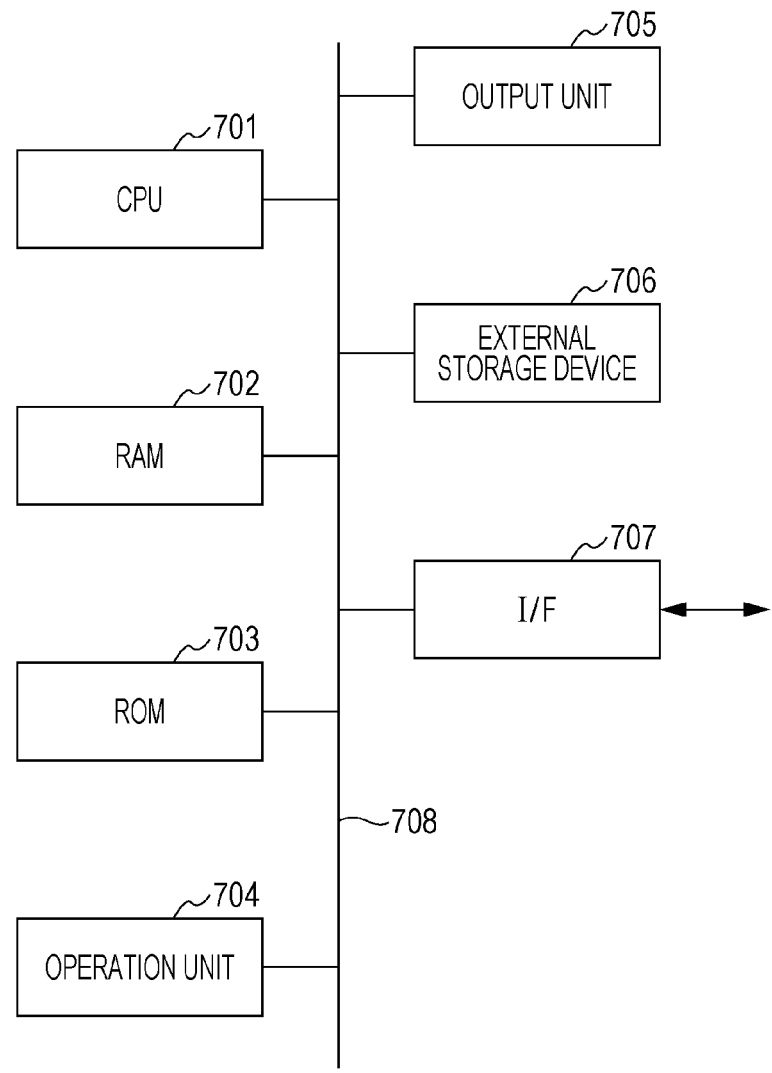

[Fig. 8A]
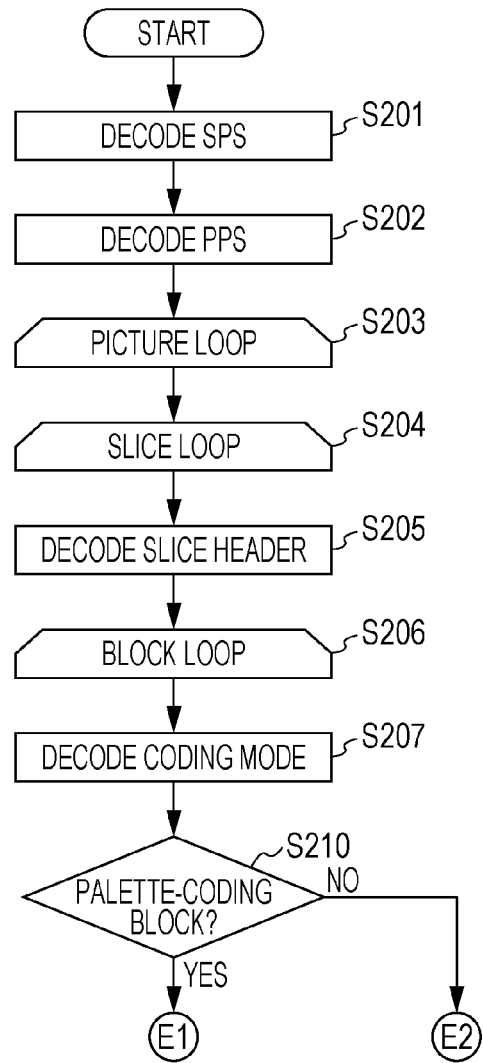

[Fig. 8B]
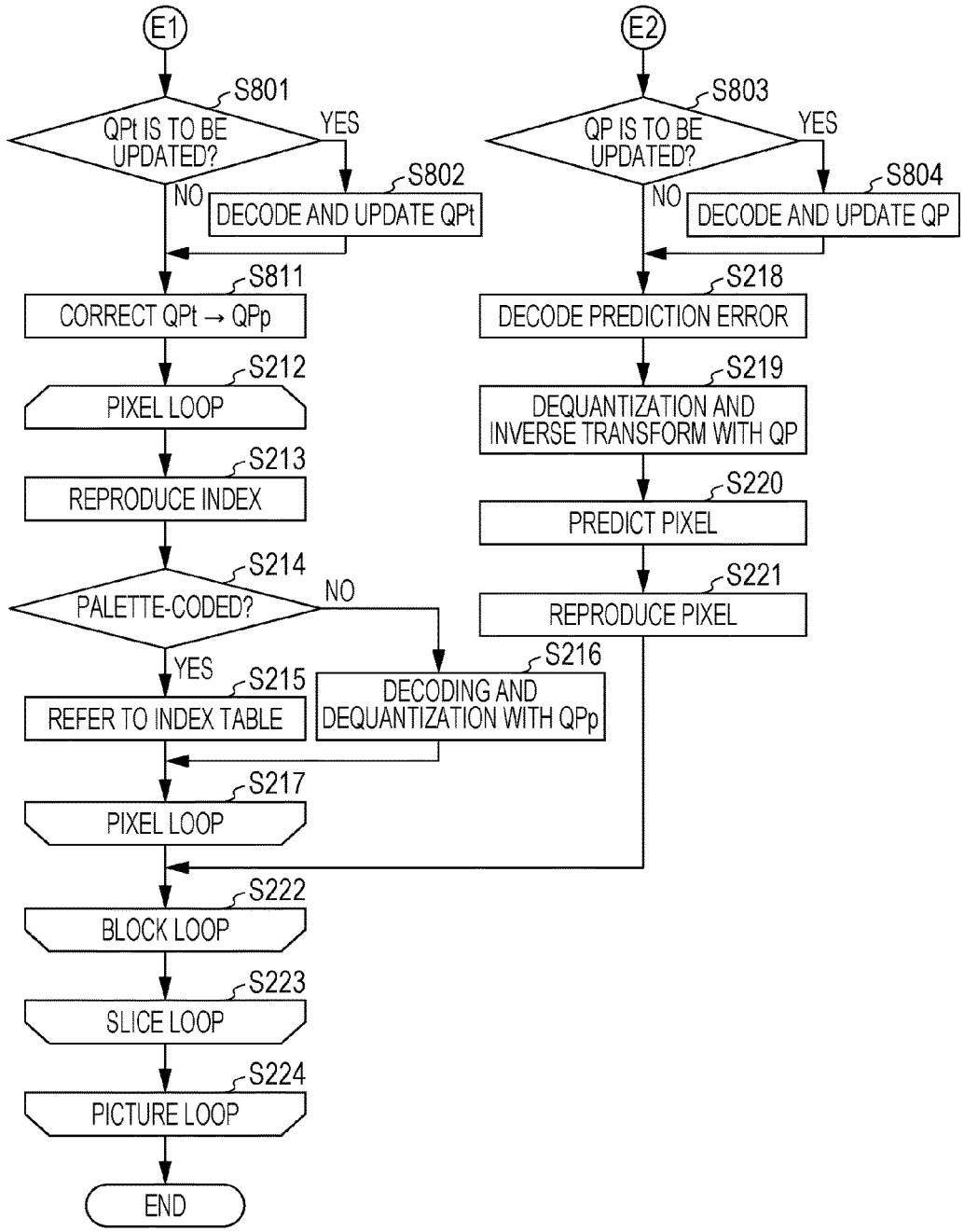

IMAGE CODING APPARATUS AND IMAGE DECODING APPARATUS FOR CODING AND DECODING A MOVING IMAGE BY REPLACING PIXELS WITH A LIMITED NUMBER OF COLORS ON A PALETTE TABLE

TECHNICAL FIELD

The present invention relates to techniques for coding and decoding a moving image, particularly to a palette coding technique for coding and decoding a moving image by replacing pixels with a certain limited number of colors on a palette table.

BACKGROUND ART

A high efficiency video coding (HEVC) scheme is available as a coding scheme for compressing and recording a moving image. As expanded specifications of HEVC, standardization of screen content coding (SCC), which enables increased compression efficiency for an artificial image different from an image captured by using a camera or the like, has been considered.

A technique called palette coding has been suggested in SCC (see PTL 1). In palette coding, a predetermined number of colors are registered in a palette table. An input value of a pixel (pixel value) is compared with a color registered in the palette table, the corresponding color is indicated by an index on the palette table, and the index is coded. In palette coding, a case may occur in which there is a color that is not expressed by a color registered in the palette table because the number of colors is limited. Such a color is called an escape value of a sample, for which the pixel value is quantized as necessary and is then coded. This coding method is referred to as escape coding.

On a computer screen or the like, which is a main target of SCC, both an artificial image and a captured image such as a photograph exist. For a captured image, prediction coding according to the related art is effective. Prediction coding is a coding scheme in which intra prediction (intra-screen prediction) and inter prediction (inter-screen prediction) are performed, and a prediction error generated through these predictions is transformed and quantized to perform coding. Therefore, in SCC, which of palette coding and prediction coding is to be performed may be selected for each coding unit (for example, each block). Hereinafter, a block on which palette coding is to be/has been performed is referred to as a palette-coding block, whereas a block on which prediction coding is to be/has been performed is referred to as a non-palette-coding block. In this way, with selective use of palette coding and prediction coding, it is possible to adaptively code an image even if both a natural image portion and a non-natural image portion exist in a screen (picture).

A quantization parameter used for quantization is a parameter that is capable of controlling image quality and an amount of code. For example, an amount of code decreases as the value of a quantization parameter increases, and image quality increases as the value of a quantization parameter decreases.

In standardization of SCC, it has been adopted as a standard proposal to use the same parameter as a quantization parameter used to code and decode a palette-coding block and as a quantization parameter used to code and decode a non-palette-coding block.

As described above, use of one quantization parameter for both escape coding and prediction coding may decrease coding efficiency. That is, in escape coding of a palette-coding block, a pixel value is quantized by using a quantization parameter. On the other hand, in prediction coding of a non-palette-coding block, a prediction error or a transform coefficient is quantized by using a quantization parameter. The transform coefficient is a coefficient that is obtained by performing orthogonal transform on a prediction error. Hereinafter, a transform coefficient that has been quantized is referred to as a quantized transform coefficient. A possible range (region) in a screen varies between a pixel value and a prediction error or a transform coefficient. The nature of a value also varies between a pixel value and a transform coefficient. That is, use of one quantization parameter is not sufficient to control both a pixel value and a transform coefficient and to efficiently perform coding.

CITATION LIST

Patent Literature

PTL 1: WO2014/165784A1

SUMMARY OF INVENTION

An image decoding apparatus according to an embodiment of the present invention has the following configuration. That is, the image decoding apparatus decodes a bit stream generated by coding an image and decodes coded data included in the bit stream and corresponding to a target block to be decoded in the image. The image decoding apparatus includes a first determining unit configured to determine whether the target block is prediction-coded or palette-coded; a second determining unit configured to determine whether or not a pixel in the target block is escape-coded if the first determining unit determines that the target block is palette-coded; and a first decoding unit configured to decode the target block by using a second quantization parameter different from a first quantization parameter if the second determining unit determines that the pixel in the target block is escape-coded, the first quantization parameter being used to decode the coded data corresponding to the target block in a case where the first determining unit determines that the target block is prediction-coded.

An image coding apparatus according to an embodiment of the present invention has the following configuration. That is, the image coding apparatus codes a target block to be coded in an image. The image coding apparatus includes a first determining unit configured to determine whether the target block is to be prediction-coded or palette-coded; a second determining unit configured to determine whether or not a pixel in the target block is to be escape-coded if the first determining unit determines that the target block is to be palette-coded; and a first coding unit configured to code the target block by using a second quantization parameter different from a first quantization parameter if the second determining unit determines that the pixel in the target block is to be escape-coded, the first quantization parameter being used to code the target block in a case where the first determining unit determines that the target block is to be prediction-coded.

Further features of the present invention will become apparent from the following description of exemplary embodiments with reference to the attached drawings.

A quantization parameter may be adaptively used for each of escape coding in palette coding and non-palette coding (prediction coding). That is, compared to the case of using the same quantization parameter for escape coding and prediction coding, different quantization parameters suitable for individual coding schemes may be used. As a result, coding efficiency may be increased.

BRIEF DESCRIPTION OF DRAWINGS

FIG. 1 is a block diagram illustrating an example configuration of an image decoding apparatus according to first and third embodiments.

FIG. 2A is a flowchart illustrating an example of image decoding processing according to the first embodiment.

FIG. 2B is the flowchart illustrating the example of image decoding processing according to the first embodiment.

FIG. 3 is a block diagram illustrating an example configuration of an image coding apparatus according to second and fourth embodiments.

FIG. 4A is a flowchart illustrating image coding processing according to the second embodiment.

FIG. 4B is the flowchart illustrating the image coding processing according to the second embodiment.

FIG. 5A is a flowchart illustrating image decoding processing according to the third embodiment.

FIG. 5B is the flowchart illustrating the image decoding processing according to the third embodiment.

FIG. 6A is a flowchart illustrating image coding processing according to the fourth embodiment.

FIG. 6B is the flowchart illustrating the image coding processing according to the fourth embodiment.

FIG. 7 is a block diagram illustrating an example hardware configuration of a computer applicable to an image coding apparatus and an image decoding apparatus.

FIG. 8A is a flowchart illustrating another example of image decoding processing according to the first embodiment.

FIG. 8B is the flowchart illustrating the other example of image decoding processing according to the first embodiment.

DESCRIPTION OF EMBODIMENTS

Hereinafter, exemplary embodiments of the present invention will be described in detail with reference to the attached drawings. The configurations described in the following embodiments are merely examples, and the present invention is not limited to the configurations illustrated in the drawings. In the following embodiments, a description will be given of the case of basically using a high efficiency video coding (HEVC) scheme as a coding scheme for compressing and recording a moving image, but the present invention is not limited thereto and another coding scheme may be used. In the following embodiments, a palette table includes information regarding pixel values representing color information of pixels, and indexes are assigned to the information regarding pixel values included in the palette table. The information regarding pixel values representing color information of pixels may be, for example, information regarding pixel values in a color space such as RGB or YCbCr.

First Embodiment

Hereinafter, an image decoding apparatus according to a first embodiment will be described with reference to the drawings. First, the configuration of an image decoding apparatus 100 according to this embodiment will be described with reference to FIG. 1. FIG. 1 is a block diagram illustrating the configuration of the image decoding apparatus 100 according to this embodiment. Referring to FIG. 1, a separating unit 101 separates, from a bit stream input to the image decoding apparatus 100, a header and a coded data. In this embodiment, the coded data constitutes pixels in units of blocks. A header decoding unit 102 decodes the header separated by the separating unit 101. Specifically, the header decoding unit 102 decodes header information, such as a sequence header, a picture header, and a slice header, and outputs them to respective units in the subsequent stage. An entropy decoding unit 103 decodes the coded data separated by the separating unit 101 and obtains information constituting pixels.

A selector 104 selects, on the basis of an input from the outside (the header decoding unit 102), either of a palette decoding unit 105 and a prediction error decoding unit 111 as an output destination of a decoding result obtained from the header decoding unit 102 and the entropy decoding unit 103. Specifically, the selector 104 selects an output destination of a decoding result obtained from the entropy decoding unit 103 in the preceding stage on the basis of a decoding result of a palette_mode_flag code output from the header decoding unit 102. In this embodiment, a palette_mode_enabled_flag code is a code indicating whether or not the palette_mode_flag code is included in the bit stream. The palette_mode_flag code is a code indicating whether the block is a palette-coding block or a non-palette-coding block.

The palette decoding unit 105 decodes a palette_index code representing indexes on the palette table of the individual pixels in the target block to be decoded that has been decoded by the entropy decoding unit 103, and thereby reproduces (reconstructs) the indexes. Subsequently, the palette decoding unit 105 selects, on the basis of the reconstructed indexes, either of a palette referring unit 108 and an escape decoding unit 110 as an output destination of a decoding result obtained from the entropy decoding unit 103. For example, in a case where the number of indexes registered in the palette table is N (hereinafter N is referred to as a value of a palette size), individual palette elements (colors) may be represented by indexes 0 to N−1. Further, escape coding may be represented by N indexes. That is, the indexes representing escape coding are based on the number of indexes (N) included in the palette table and the number of colors (N−1) included in the palette table. In a case where the number of reconstructed indexes is N (other than 0 to N−1), the palette decoding unit 105 performs processing under the assumption that the target coded data to be decoded is data of a pixel on which escape coding has been performed.

A QP decoding unit 106 decodes a slice_qp_delta code included in the slice header and a code related to update of a quantization parameter included in coded data of each block, and thereby reconstructs a quantization parameter. The slice_qp_delta code represents an initial value of a quantization parameter in a slice. Examples of a code related to update of a quantization parameter include a cu_qp_delta_abs code and a cu_qp_delta_sign_flag code. The former represents an absolute value of a difference in quantization parameter and the latter represents a code of a difference in quantization parameter. The image decoding apparatus 100 updates a quantization parameter on the basis of the cu_qp_delta_abs code and the cu_qp_delta_sign_flag code.

A QP memory 107 stores the quantization parameter decoded by the QP decoding unit 106.

The palette referring unit 108 receives an index, which corresponds to a decoding result of the palette_index code obtained through decoding performed by the palette decoding unit 105, reads information regarding the pixel value on the palette table corresponding to the index, and outputs the information as a reproduced pixel value. In this embodiment, a reproduced pixel value represents a pixel value that is obtained as a result of decoding a target pixel to be decoded. A QP correcting unit 109 corrects the quantization parameter decoded by the QP decoding unit 106 to a quantization parameter that is to be used for decoding an escape-coded block. The escape decoding unit 110 decodes escape-coded data, performs dequantization thereon, and outputs the data as a reproduced pixel value. In this embodiment, if the palette decoding unit 105 determines that the value of the palette_index code is equal to the value of a palette size, the escape decoding unit 110 performs the following processing. That is, the escape decoding unit 110 decodes a subsequent palette_escape_val code and reproduces (reconstructs) a quantized pixel value. Further, the escape decoding unit 110 receives a corrected value QPp of a quantization parameter (corrected quantization parameter) from the QP correcting unit 109, performs dequantization thereon, and generates a reproduced pixel value. The prediction error decoding unit 111 decodes coded data of a block input via the entropy decoding unit 103 and reproduces (reconstructs) a quantized transform coefficient. Further, the prediction error decoding unit 111 performs dequantization and inverse orthogonal transform on the reproduced quantized transform coefficient, and reproduces (reconstructs) prediction error data.

A pixel predicting and reconstructing unit 112 performs prediction processing on decoded image data stored in a picture memory 115 on the basis of information decoded by the entropy decoding unit 103, such as a prediction mode and a motion vector. Subsequently, the pixel predicting and reconstructing unit 112 adds a result of predicting the decoded image data (predicted image data) and the prediction error data reconstructed by the prediction error decoding unit 111, so as to reproduce a pixel value. A pixel reconstructing unit 113 receives a reproduced pixel value reproduced by the palette referring unit 108 or the escape decoding unit 110 and reconstructs a target block to be decoded as decoded image data. A decoded image buffer 114 temporarily stores the image data that has been reconstructed by the pixel reconstructing unit 113 and obtained by decoding the target block, so as to output it to the outside in units of slices. Pieces of pixel data that are necessary for reference are sequentially output to the picture memory 115. The picture memory 115 stores reproduced image data as a reference image to be used for prediction coding.

Next, a description will be given of image decoding processing performed in the image decoding apparatus 100 according to this embodiment with reference to FIGS. 2A and 2B. FIGS. 2A and 2B include a flowchart illustrating a procedure of the image decoding processing performed in the image decoding apparatus 100 according to this embodiment. The processing of the flowchart illustrated in FIGS. 2A and 2B is started after startup of the image decoding apparatus 100 has been completed and a bit stream to be decoded has been determined.

In step S201, the separating unit 101 inputs, to the header decoding unit 102, coded data of a sequence parameter set (SPS), which is header information representing the specifications of a moving image sequence. Also, in step S201, the header decoding unit 102 decodes the coded data of the SPS received from the separating unit 101. In this embodiment, the SPS includes information representing the size of the image, a maximum block size, and so forth. Also, in this embodiment, the SPS includes a palette_mode_enabled_flag code representing a possibility that a code using palette coding is included in the moving image sequence as an expanded parameter set. In this embodiment, if the value of the palette_mode_enabled_flag code is 1, the header decoding unit 102 determines that there is a possibility that a palette-coded block is included in a slice. On the other hand, if the value of the palette_mode_enabled_flag code is 0, the header decoding unit 102 determines that a palette-coded block is not included in a slice. Subsequently, the header decoding unit 102 outputs the value of the palette_mode_enabled_flag code to the entropy decoding unit 103.

Further, in step S201, the entropy decoding unit 103 decodes a palette_mode_flag code in units of blocks in accordance with the value of the palette_mode_enabled_flag code. Specifically, if the value of the palette_mode_enabled_flag code is 1, the entropy decoding unit 103 decodes the value of the palette_mode_flag code and outputs the decoded value of the palette_mode_flag code to the selector 104. On the other hand, if the value of the palette_mode_enabled_flag code is 0, the entropy decoding unit 103 does not decode the value of the palette_mode_flag code and outputs 0 as the value of the palette_mode_flag code to the selector 104. The selector 104 determines an output destination of the decoding result of the entropy decoding unit 103 to be the palette decoding unit 105 if the value of the palette_mode_flag code received from the entropy decoding unit 103 is 1. On the other hand, if the value of the palette_mode_flag code is 0, the selector 104 determines an output destination of the decoding result of the entropy decoding unit 103 to be the prediction error decoding unit 111.

In step S202, the separating unit 101 inputs, to the header decoding unit 102, coded data of a picture parameter set (PPS) representing the specifications of individual pictures of the moving image. Also, in step S202, the header decoding unit 102 decodes the coded data of the PPS input from the separating unit 101. In this embodiment, the PPS includes a cu_qp_delta_enabled_flag code indicating whether or not a quantization parameter is updatable in units of blocks. Further, in this embodiment, the PPS includes a transquant_bypass_enabled_flag code representing a possibility that bypass processing is performed in which inverse orthogonal transform and dequantization are not performed. The header decoding unit 102 inputs, to the entropy decoding unit 103, the values of the cu_qp_delta_enabled_flag code and the transquant_bypass_enabled_flag code.

In step S203, the image decoding apparatus 100 starts a loop of decoding the moving image in units of pictures. From step S203 through step S224, the image decoding apparatus 100 performs processing within pictures and decodes all the pictures included in the moving image sequence.

In step S204, the image decoding apparatus 100 starts a loop of decoding a target picture to be decoded in units of slices. From step S204 through step S223, the image decoding apparatus 100 performs processing within slices and decodes all the slices included in the target picture to be decoded.

In step S205, the separating unit 101 inputs coded data of a slice header, which is header information representing the specifications of a slice of the moving image, to the header decoding unit 102. The header decoding unit 102 decodes the coded data of the slice header input from the separating unit 101. In this embodiment, the slice header includes a slice_qp_delta code that is used to calculate an initial value of a quantization parameter used to dequantize each block in the target slice to be decoded. The header decoding unit 102 decodes the coded data of the slice header and thereby obtains a value of the slice_qp_delta code. That is, the header decoding unit 102 decodes the slice_qp_delta code included in the slice header and obtains the value of the slice_qp_delta code. Subsequently, the header decoding unit 102 outputs the obtained value of the slice_qp_delta code to the QP decoding unit 106.

Further, in step S205, the QP decoding unit 106 calculates a quantization parameter QP on the basis of the value of the slice_qp_delta code input from the header decoding unit 102. In this embodiment, the value of the quantization parameter QP is calculated by using the HEVC coding scheme. Subsequently, the QP decoding unit 106 outputs the calculated quantization parameter QP to the QP memory 107, the QP correcting unit 109, and the prediction error decoding unit 111. The QP memory 107 stores quantization parameters QP input thereto in units of blocks.

In step S206, the image decoding apparatus 100 starts a loop of decoding a target slice to be decoded in units of blocks. From step S206 through step S222, the image decoding apparatus 100 performs processing within blocks and decodes all the blocks included the target slice to be decoded.

In step S207, the separating unit 101 inputs the coded data to the entropy decoding unit 103 in units of blocks. In step S207, the entropy decoding unit 103 decodes the coded data of a block input from the separating unit 101. Here, the entropy decoding unit 103 performs the following processing if the value of the transquant_bypass_enabled_flag code included in the PPS decoded in step S202 is 1. That is, the entropy decoding unit 103 decodes a cu_transquant_bypass_flag code included in the coded data of the block. The cu_transquant_bypass_flag code indicates whether dequantization and inverse orthogonal transform are to be performed on the target block to be decoded or not (skipped or not). In this embodiment, a value 1 of the cu_transquant_bypass_flag code indicates that dequantization and inverse orthogonal transform are not performed on a prediction error that is calculated by entropy-decoding the coded data of the block. A value 0 thereof indicates that dequantization and inverse orthogonal transform are to be performed on a prediction error that is calculated by entropy-decoding the coded data of the block.

In step S207, the entropy decoding unit 103 decodes a prediction mode that is to be used for performing prediction processing on the target block to be decoded. If the decoded prediction mode is an intra prediction mode, the entropy decoding unit 103 obtains (refers to) the value of the palette_mode_enabled_flag code decoded by the header decoding unit 102 in step S201. If the value of the palette_mode_enabled_flag code is 1, the entropy decoding unit 103 decodes the palette_mode_flag code to generate a value of the palette_mode_flag code. On the basis of the generated value of the palette_mode_flag code, the entropy decoding unit 103 determines whether the target block to be decoded is a palette-coding block or a non-palette-coding block. That is, in this embodiment, the entropy decoding unit 103 determines that the target block to be decoded is a palette-coding block if the value of the palette_mode_flag code is 1. The entropy decoding unit 103 determines that the target block to be decoded is a non-palette-coding block if the value of the palette_mode_flag code is 0. If the value of the palette_mode_enabled_flag code is 0, it is assumed that a palette_mode_flag code does not exist in the bit stream and that the value of the palette_mode_flag code is 0.

If the value of the cu_qp_delta_enabled_flag code is 1 and if the cu_qp_delta_abs code and the cu_qp_delta_sign_flag code are included in the slice header, the entropy decoding unit 103 decodes these codes. If the cu_qp_delta_abs code and the cu_qp_delta_sign_flag code are included in the slice header, it indicates that the quantization parameter has been updated. Subsequently, the entropy decoding unit 103 outputs the decoded values of the cu_qp_delta_abs code and the cu_qp_delta_sign_flag code to the QP decoding unit 106.

In step S208, the QP decoding unit 106 determines whether or not the value of the cu_qp_delta_abs code and the value of the cu_qp_delta_sign_flag code have been input from the entropy decoding unit 103. If the values of these codes have been input, the QP decoding unit 106 determines that the quantization parameter QP is to be updated, and the processing proceeds to step S209. On the other hand, if the values of these codes have not been input, the processing proceeds to step S210.

In step S209, the QP decoding unit 106 decodes the values of the cu_qp_delta_abs code and the cu_qp_delta_sign_flag code input from the entropy decoding unit 103. That is, the QP decoding unit 106 decodes these codes and thereby reconstructs an error ΔQP representing a difference value in quantization parameter between the target block to be decoded and the block decoded just before the target block. The QP decoding unit 106 obtains (refers to) a quantization parameter QP_prev, which is stored in the QP memory 107 and which has been used to decode (quantize) the previous block of the target block. Further, the QP decoding unit 106 adds the reconstructed error ΔQP and the obtained quantization parameter QP_prev to generate (update) the quantization parameter QP that is to be used to quantize the target block to be decoded. Subsequently, the QP decoding unit 106 outputs the updated quantization parameter QP to the QP memory 107, and the QP memory 107 stores the quantization parameter QP input thereto. Also, the QP decoding unit 106 outputs the updated quantization parameter QP to the QP correcting unit 109 and the prediction error decoding unit 111.

The quantization parameter QP_prev that is referred to is not limited to the quantization parameter QP_prev of the block decoded just before the target block, and a value generated on the basis of quantization parameters that have been used to quantize a plurality of decoded blocks may be used as the quantization parameter QP_prev. For example, among a plurality of quantization parameters stored in the QP memory 107, an average value of quantization parameters of a block located above the target block to be decoded and a block located on the left of the target block in the target picture to be decoded may be used as the quantization parameter QP_prev.

In step S210, the entropy decoding unit 103 determines whether the target block to be decoded is a palette-coding block or a non-palette-coding block. In this embodiment, the entropy decoding unit 103 is capable of determining whether the target block to be decoded is a palette-coding block or a non-palette-coding block on the basis of the value of the palette_mode_flag code decoded by the header decoding unit 102. That is, if the value of the palette_mode_flag code is 1, the entropy decoding unit 103 determines that the target block to be decoded is a palette-coding block and the processing proceeds to step S211. On the other hand, if the value of the palette_mode_flag code is 0, the entropy decoding unit 103 determines that the target block to be decoded is a non-palette-coding block and the processing proceeds to step S218. Also, in step S210, the selector 104 determines the output destination of the decoding results of the header decoding unit 102 and the entropy decoding unit 103 on the basis of the value of the palette_mode_flag code. That is, the selector 104 designates the palette decoding unit 105 as the output destination if the value of the palette_mode_flag code is 1, whereas designates the prediction error decoding unit 111 as the output destination if the value of the palette_mode_flag code is 0.

Now, a description will be given of processing that is performed if the target block to be decoded is a palette-coding block (if the value of the palette_mode_flag code is 1 in step S210).

In step S211, the QP correcting unit 109 corrects the quantization parameter QP input from the QP memory 107 via the QP decoding unit 106 and calculates a corrected value QPp of the quantization parameter. Subsequently, the QP correcting unit 109 outputs the calculated corrected value QPp of the quantization parameter to the escape decoding unit 110. The corrected value QPp of the quantization parameter calculated by the QP correcting unit 109 is used for dequantization in the case of decoding escape-coded data. The QP correcting unit 109 holds the calculated corrected value QPp of the quantization parameter.

Now, a description will be given of a method for calculating, with the QP correcting unit 109, a corrected value QPp of the quantization parameter. The QP correcting unit 109 adds a predetermined value PALETTE_ESCAPE_QP_DEFAULT_OFFSET to the quantization parameter QP input from the QP decoding unit 106 as expressed by the following Equation (1), and thereby corrects the quantization parameter. PALETTE_ESCAPE_QP_DEFAULT_OFFSET may be calculated (set, determined) on the basis of a difference between a possible range of a bit depth and/or a pixel value of the image data to be decoded and a possible range of a prediction error.

$$QPp = QP + PALETTE\_ESCAPE\_QP\_DEFAULT\_OFFSET \quad (1)$$

In step S212, the image decoding apparatus 100 starts a loop of performing decoding in units of pixels. From step S212 through step S217, the image decoding apparatus 100 performs processing in units of pixels in the target block to be decoded and decodes all the pixels included in the target block to be decoded.

In step S213, the palette decoding unit 105 decodes a palette_index code for each pixel to reproduce an index.

In step S214, the palette decoding unit 105 determines whether or not the target pixel to be decoded in the target block to be decoded is palette-coded or escape-coded. In step S214 of this embodiment, if the value of the index reconstructed in step S213 is smaller than the value of the palette size, the palette decoding unit 105 determines that the target pixel to be decoded is palette-coded, and the processing proceeds to step S215. Further, if the target pixel to be decoded is palette-coded (YES in step S214), the palette decoding unit 105 outputs the reconstructed index to the palette referring unit 108. On the other hand, if it is determined in step S214 that the value of the index reconstructed in step S213 is equal to the value of the palette size, the palette decoding unit 105 determines that the target pixel to be decoded is escape-coded, and the processing proceeds to step S216. Further, if the target pixel to be decoded is escape-coded (NO in step S214), the palette decoding unit 105 inputs a palette_escape_val code following the palette_index code to the escape decoding unit 110. In step S214 of this embodiment, the palette decoding unit 105 compares the value of the index reconstructed in step S213 with the value of the palette size and thereby determines whether the target pixel to be decoded is palette-coded or escape-coded. However, the method for determining whether the target pixel to be decoded is palette-coded or escape-coded is not limited thereto. That is, in step S214 of this embodiment, the palette decoding unit 105 may make a determination on the basis of the value of the index reconstructed in step S213 and an index included in the palette table.

In step S215, the palette referring unit 108 refers to the index decoded by the palette decoding unit 105 in step S214 and regards a pixel value representing a color that is indicated by (corresponds to) the index and that is registered in the palette table as a reproduced pixel value. Subsequently, the palette referring unit 108 outputs the reconstructed pixel value to the pixel reconstructing unit 113, and the pixel reconstructing unit 113 stores the reproduced pixel value input thereto at an adaptive position in the target block to be decoded.

In step S216, the escape decoding unit 110 decodes the palette_escape_val code included in the coded data of the block to reproduce (reconstruct) a quantized pixel value (escape quantization coefficient). In this embodiment, the escape decoding unit 110 obtains the palette_escape_val code from the entropy decoding unit 103 via the selector 104 and the palette decoding unit 105. Further, in step S216, the escape decoding unit 110 calculates a quantization step by using the corrected value QPp of the quantization parameter corrected by the QP correcting unit 109 in step S211. Subsequently, the escape decoding unit 110 dequantizes the quantized pixel value by using the calculated quantization step so as to reconstruct a pixel value (reproduced pixel value). The pixel reconstructing unit 113 stores the reproduced pixel value at an adaptive position in the target block to be decoded.

In step S217, the pixel reconstructing unit 113 determines whether or not decoding processing has been performed on all the pixels in the target block to be decoded. If the pixel reconstructing unit 113 determines that decoding processing has been performed on all the pixels, the pixel reconstructing unit 113 outputs the reproduced pixel values to the decoded image buffer 114. The decoded image buffer 114 appropriately outputs, to the picture memory 115, a reconstructed image corresponding to the pixel values in units of blocks input from the pixel reconstructing unit 113. On the other hand, if the pixel reconstructing unit 113 determines in step S217 that decoding processing has not been performed on all the pixels in the target block to be decoded, the processing returns to step S212 and the image decoding apparatus 100 performs decoding processing on the next pixel.

Next, a description will be given of processing that is performed if the target block to be decoded is a non-palette-coding block (if the value of the palette_mode_flag code is 0 in step S210).

In step S218, the prediction error decoding unit 111 receives coded data of a quantized transform coefficient of a prediction error from the entropy decoding unit 103 via the selector 104. Subsequently, the prediction error decoding unit 111 decodes the coded data of a quantized transform coefficient of a prediction error input thereto and reconstructs a quantized transform coefficient. Here, the quantized transform coefficient is a coefficient that is calculated by performing, in a coding apparatus that codes an image, orthogonal transform and quantization on a prediction error calculated by performing prediction processing on an image.

In step S219, the prediction error decoding unit 111 dequantizes the quantized transform coefficient reconstructed in step S218, and thereby reconstructs a transform coefficient (orthogonal transform coefficient). Further, the prediction error decoding unit 111 performs inverse orthogonal transform on the reconstructed transform coefficient, and thereby reconstructs a prediction error. The prediction error decoding unit 111 outputs the reconstructed prediction error to the pixel predicting and reconstructing unit 112. In this embodiment, the prediction error decoding unit 111 calculates a quantization step by using the quantization parameter QP calculated by the QP decoding unit 106 in step S205 or S209, and dequantizes the quantized transform coefficient by using the calculated quantization step.

In step S220, the pixel predicting and reconstructing unit 112 performs prediction processing on the decoded image data stored in the picture memory 115 on the basis of the information decoded by the entropy decoding unit 103, and thereby generates predicted image data. Here, the pixel predicting and reconstructing unit 112 obtains information to be used for performing prediction processing, such as a coding mode, an intra prediction mode, and a motion vector, decoded by the entropy decoding unit 103. Subsequently, the pixel predicting and reconstructing unit 112 generates predicted image data by referring to the pixel values stored in the picture memory 115 on the basis of the obtained information.

In step S221, the pixel predicting and reconstructing unit 112 adds the predicted image data generated in step S220 and the prediction error reconstructed by the prediction error decoding unit 111 in step S219, and thereby reconstructs pixel values. Subsequently, the pixel predicting and reconstructing unit 112 outputs the reconstructed pixel values to the decoded image buffer 114. The decoded image buffer 114 appropriately outputs, to the picture memory 115, the image data that has been reconstructed by the pixel reconstructing unit 113 and that has been obtained by decoding the target block to be decoded.

In step S222, the decoded image buffer 114 determines whether or not decoding processing has been performed on all the blocks in the target slice to be decoded. If the decoded image buffer 114 determines that decoding processing has been performed on all the blocks, the decoded image buffer 114 appropriately outputs the reconstructed image data in units of slices to the outside of the image decoding apparatus 100. On the other hand, if the decoded image buffer 114 determines in step S222 that decoding processing has not been performed on all the blocks in the target slice to be decoded, the processing returns to step S206, and the image decoding apparatus 100 performs decoding processing on the next block.

In step S223, the decoded image buffer 114 determines whether or not decoding processing has been performed on all the slices in the target picture to be decoded. If the decoded image buffer 114 determines that decoding processing has been performed on all the slices, the processing proceeds to step S224. On the other hand, if the decoded image buffer 114 determines in step S223 that decoding processing has not been performed on all the slices in the target picture to be decoded, the processing returns to step S204, and the image decoding apparatus 100 performs decoding processing on the next slice.

In step S224, the separating unit 101 determines whether or not decoding processing has been performed on all the pictures input to the image decoding apparatus 100. Specifically, the separating unit 101 determines whether or not there is coded data that has not been decoded in the image decoding apparatus 100. If the separating unit 101 determines in step S224 that decoding processing has been performed on all the input pictures, the image decoding apparatus 100 ends the image decoding processing. On the other hand, if the separating unit 101 determines in step S224 that decoding processing has not been performed on all the input pictures, the processing returns to step S203, and the image decoding apparatus 100 performs decoding processing on the next picture.

As described above, with the configuration of the image decoding apparatus 100 according to this embodiment and image decoding processing performed thereby, quantization parameters are adaptively used for dequantization of a prediction error in non-palette coding (prediction coding) and dequantization of a pixel value in palette coding. That is, different quantization parameters may be used for a palette-coding block and a non-palette-coding block. In this way, the image decoding apparatus 100 according to this embodiment is capable of performing decoding processing by using quantization parameters that are respectively suitable for a palette-coding block and a non-palette-coding block. Thus, the image decoding apparatus 100 according to this embodiment is capable of increasing coding efficiency compared to the case of using the same quantization parameter for both a palette-coding block and a non-palette-coding block.

In particular, regarding a palette-coding block, decoding processing may be performed by considering a difference between a possible range of a bit depth and/or a pixel value of image data to be processed and a possible range of a prediction error.

Further, in this embodiment, the image decoding apparatus 100 is capable of correcting a quantization parameter used for a non-palette-coding block to generate a quantization parameter used to dequantize a palette-coding block. That is, a quantization parameter for a palette-coding block and a quantization parameter for a non-palette-coding block may be generated from one quantization parameter for a block. Thus, it is not necessary for a coding apparatus to insert a quantization parameter for a palette-coding block and a quantization parameter for a non-palette-coding block into a bit stream, and accordingly an increase in the amount of code may be suppressed.

In this embodiment, the quantization parameter QP is corrected by adding the predetermined value PALETTE_ESCAPE_QP_DEFAULT_OFFSET as expressed by Equation (1), but the correction method is not limited thereto. The quantization parameter QP may be corrected by, for example, multiplying the predetermined value as expressed by the following Equation (2) or shifting the value of the quantization parameter by the predetermined value as expressed by the following Equation (3).

$$QPp = QP \times PALETTE\_ESCAPE\_QP\_DEFAULT\_OFFSET \quad (2)$$

$$QPp = QP << PALETTE\_ESCAPE\_QP\_DEFAULT\_OFFSET \quad (3)$$

Further, in the case of correcting the quantization parameter QP, a variable value may be used instead of the predetermined fixed value (PALETTE_ESCAPE_QP_DEFAULT_OFFSET). For example, if PALETTE_ESCAPE_QP_DEFAULT_OFFSET is a variable value, a coding side inserts, into the header of a sequence parameter set, coded data that is obtained by coding PALETTE_ESCAPE_QP_DEFAULT_OFFSET. That is, on a decoding side, the header decoding unit 102 decodes the coded data, and thereby PALETTE_ESCAPE_QP_DEFAULT_OFFSET to be added at correction may be obtained, and the corrected value QPp of the quantization parameter may be calculated. Accordingly, the image decoding apparatus 100 is also capable of calculating the corrected value QPp of the quantization parameter by using a variable value as PALETTE_ESCAPE_QP_DEFAULT_OFFSET expressed by Equations (2) and (3) given above.

In this embodiment, the image decoding apparatus 100 simultaneously controls quantization parameters for palette coding and non-palette coding by using the quantization parameter QP, but this embodiment is not limited thereto. For example, a quantization parameter for palette coding and a quantization parameter for non-palette coding may be individually prepared. In this case, the image decoding apparatus 100 may determine whether the target block to be decoded is a palette-coding block or a non-palette-coding block, and may perform decoding processing by using either of the prepared quantization parameters.

Next, a description will be given of processing performed by the image decoding apparatus 100 in a case where palette-coding blocks follow non-palette-coding blocks, and non-palette coding blocks follow the palette-coding blocks. In this case, in order to perform the same control of the image quality for the non-palette-coding blocks before and after the palette-coding blocks, the image decoding apparatus 100 updates the quantization parameter for the palette-coding blocks coming after the non-palette-coding blocks. With the quantization parameter being updated, the quantization parameters for the palette-coding blocks and the non-palette-coding blocks may be individually controlled. After that, for the non-palette-coding blocks that follow the palette-coding blocks, it is necessary for the image decoding apparatus 100 to change the quantization parameter to the quantization parameter that was used for the non-palette-coding blocks before the palette-coding blocks. In other words, it is necessary for the image decoding apparatus 100 to update the quantization parameter again.

In a case where the quantization parameter is updated for the palette-coding blocks, it is necessary to update the quantization parameter for the non-palette-coding blocks that follow the palette-coding blocks by considering the quantization parameter updated at the first block among the palette-coding blocks. That is, it is necessary to constantly hold a difference value between the quantization parameter updated at the first block among the palette-coding blocks and/or the quantization parameters before and after the update, which will increase the processing load. Further, it is necessary to code and decode these quantization parameters, which may decrease coding efficiency.

As described above, in consideration of a case where the quantization parameter is updated for the palette-coding blocks, the image decoding apparatus 100 may perform the following processing. That is, the image decoding apparatus 100 provides a temporary quantization parameter QPt and duplicates (sets) the quantization parameter QP calculated as an initial value by the QP decoding unit 106 to the temporary quantization parameter QPt. If the value of the palette_mode_flag code is 0, the image decoding apparatus 100 updates the quantization parameter QP on the basis of the value of the cu_qp_delta_abs code and the value of the cu_qp_delta_sign_flag code. On the other hand, if the value of the palette_mode_flag code is 1, the image decoding apparatus 100 updates the temporary quantization parameter QPt on the basis of the value of the cu_qp_delta_abs code and the value of the cu_qp_delta_sign_flag code. In this processing, the temporary quantization parameter QPt is used for only palette-coding blocks, and thus the image decoding apparatus 100 uses the following Equation (1') instead of Equation (1) in step S211.

$$QPp = QPt + PALETTE\_ESCAPE\_QP\_DEFAULT\_OFFSET \qquad (1')$$

In this way, with the temporary quantization parameter QPt being used, it is not necessary for the image decoding apparatus 100 to hold the quantization parameter updated at the first block among the palette-coding blocks in a case where the quantization parameter is updated for the palette-coding blocks. Also, it is not necessary for the image decoding apparatus 100 to hold a difference value between quantization parameters before and after the update.

In this embodiment, the image decoding apparatus 100 performs image decoding processing on the basis of the flowchart illustrated in FIGS. 2A and 2B, but this embodiment is not limited thereto. For example, the image decoding apparatus 100 may perform image decoding processing on the basis of the flowchart illustrated in FIGS. 8A and 8B. The processing illustrated in FIGS. 8A and 8B is different from the processing illustrated in FIGS. 2A and 2B in that the QP decoding unit 106 holds a temporary quantization parameter QPt in addition to the quantization parameter QP.

In step S205, the QP decoding unit 106 duplicates (sets) the quantization parameter QP, which is a calculated initial value, as an initial value of the temporary quantization parameter QPt.

If the entropy decoding unit 103 determines in step S210 that the target block to be decoded is a palette-coding block, the processing proceeds to step S801. On the other hand, if the entropy decoding unit 103 determines in step S210 that the target block to be decoded is a non-palette-coding block, the processing proceeds to step S803.

In step S801, the QP decoding unit 106 determines, on the basis of the presence/absence of the value of the cu_qp_delta_abs code and the value of the cu_qp_delta_sign_flag code, whether or not the quantization parameter is to be updated. If the QP decoding unit 106 determines that the quantization parameter is to be updated, the processing proceeds to step S802. If the QP decoding unit 106 determines that the quantization parameter is not to be updated, the processing proceeds to step S811.

In step S802, the QP decoding unit 106 updates the temporary quantization parameter QPt duplicated in step S205 on the basis of the value of the cu_qp_delta_abs code and the value of the cu_qp_delta_sign_flag code.

In step S811, the QP correcting unit 109 calculates a corrected value QPp of the quantization parameter on the basis of Equation (1').

In step S803, the QP decoding unit 106 determines, on the basis of the presence/absence of the value of the cu_qp_delta_abs code and the value of the cu_qp_delta_sign_flag code, whether or not the quantization parameter is to be updated. If the QP decoding unit 106 determines that the quantization parameter is to be updated, the processing proceeds to step S804. If the QP decoding unit 106 determines that the quantization parameter is not to be updated, the processing proceeds to step S218.

In step S804, the QP decoding unit 106 updates the quantization parameter QP duplicated in step S205 on the basis of the value of the cu_qp_delta_abs code and the value of the cu_qp_delta_sign_flag code.

With the above-described processing illustrated in FIGS. 8A and 8B, the quantization parameter adaptive to palette coding and non-palette coding may be updated by using the same value of the cu_qp_delta_abs code and the same value of the cu_qp_delta_sign_flag code.

In this embodiment, a description has been given of a case where one quantization parameter QP is handled for one target block to be processed, but this embodiment is not limited thereto. For example, quantization parameters may be used independently for luminance and chrominance.

In this embodiment, a description has been given of an example in which the quantization parameter of the previous block is used as a reference value (predicted value) in the case of coding a difference in quantization parameter, but this embodiment is not limited thereto. For example, an average value of the quantization parameters of a block on the left of the target block and a block above the target block may be used as a reference value.

Second Embodiment

Hereinafter, an image coding apparatus according to a second embodiment will be described with reference to the drawings. First, the configuration of an image coding apparatus 300 according to this embodiment will be described with reference to FIG. 3. FIG. 3 is a block diagram illustrating the configuration of the image coding apparatus 300 according to this embodiment. Referring to FIG. 3, a picture buffer 301 temporarily stores image data to be coded in units of pictures. A block dividing unit 302 extracts a target block to be coded from a picture input from the picture buffer 301.

A setting unit 303 determines whether or not palette coding is able to be performed on a target block to be coded, whether or not orthogonal transform and quantization are able to be omitted (skipped), and whether or not quantization parameters are able to be controlled (adjusted) in units of blocks. Here, the setting unit 303 outputs a palette_mode_enabled_flag code regarding whether or not there is a possibility of using palette coding in a sequence. Also, the setting unit 303 outputs a transquant_bypass_enabled_flag code regarding whether or not orthogonal transform and quantization are able to be skipped. Also, the setting unit 303 outputs a cu_qp_delta_enabled_flag code regarding whether or not quantization parameters are able to be adjusted in units of blocks.

A palette determining unit 304 determines whether or not palette coding is to be performed on image data of a block output from the block dividing unit 302. If the value of the palette_mode_enabled_flag code output from the setting unit 303 is 1, the palette determining unit 304 outputs a palette_mode_flag code as a determination result of whether or not palette coding is to be performed. On the other hand, if the value of the palette_mode_enabled_flag code output from the setting unit 303 is 0, the palette determining unit 304 sets the value of the palette_mode_flag code to 0. On the basis of the value of the palette_mode_flag code output from the palette determining unit 304, a selector 305 determines the output destination of the image data in units of blocks output from the block dividing unit 302. If the value of the palette_mode_flag code output from the palette determining unit 304 is 1, the selector 305 inputs pixel values that have been input thereto in units of blocks to a pixel determining unit 306. On the other hand, if the value of the palette_mode_flag code output from the palette determining unit 304 is 0, the selector 305 inputs pixel values that have been input thereto in units of blocks to a prediction error generating unit 313.

The pixel determining unit 306 determines, regarding pixel values of a block input from the block dividing unit 302 via the selector 305, whether to perform palette coding or escape coding. That is, the pixel determining unit 306 determines whether or not a pixel value of a pixel input thereto is a pixel value of a color registered in the palette table. If the pixel value of the pixel is a pixel value of a color registered in the palette table, the pixel determining unit 306 outputs the image data of the pixel to a palette coding unit 310. Otherwise, the pixel determining unit 306 outputs the image data of the pixel to an escape coding unit 312.

In this embodiment, the palette table is held by the pixel determining unit 306. That is, the pixel determining unit 306 compares image data of a pixel input thereto with information on a color included in the palette table held thereby, and determines whether or not the image data of the pixel matches the color included in the palette table. The processing unit that holds the palette table is not limited to the pixel determining unit 306, and another processing unit may hold the palette table. That is, another processing unit may compare image data of a pixel input to the pixel determining unit 306 with the palette table held thereby, and the pixel determining unit 306 may obtain information regarding a comparison result. Alternatively, the pixel determining unit 306 may obtain the palette table held by another processing unit and compare it with image data of a pixel input thereto.

A rate control unit 307 calculates a quantization parameter QP to control the rate of coded data on the basis of the amount of coded data generated by a combining unit 318. A QP setting and updating unit 308 performs processing for coding the quantization parameter QP calculated by the rate control unit 307. First, the QP setting and updating unit 308 sets an initial value of a quantization parameter in units of slices on the basis of the quantization parameter QP calculated by the rate control unit 307. The quantization parameter QP determined by the QP setting and updating unit 308 is regarded as the quantization parameter QP of the head block of the target slice to be coded (the first block to be coded). Subsequently, the QP setting and updating unit 308 inputs the determined quantization parameter to a header coding unit 316. The header coding unit 316 codes the slice_qp_delta code, which is inserted to the slice header. Further, the QP setting and updating unit 308 calculates a difference value between the quantization parameters used for the target block to be processed and the previous block in the case of updating (changing) the quantization parameter of the target block to be processed from the quantization parameter used for the previous block. The difference value between the quantization parameter of the target block to be processed and the quantization parameter used for the previous block corresponds to the value of the cu_qp_delta_abs code and the value of the cu_qp_delta_sign_flag code, and is coded by an entropy coding unit 317.

A QP memory 309 stores the quantization parameter QP determined by the QP setting and updating unit 308. The palette coding unit 310 determines an index indicating a pixel value input from the block dividing unit 302 via the selector 305. Here, the index indicating the pixel value is an index indicating the color corresponding to the pixel value among the colors included in the palette table. A QP correcting unit 311 corrects the quantization parameter calculated by the rate control unit 307 and generates a corrected value QPp of the quantization parameter to be used for quantization in escape coding. The escape coding unit 312 quantizes the target block to be coded by using the corrected value QPp of the quantization parameter generated by the QP correcting unit 311. A pixel reconstructing unit 319 locally decodes (reconstructs) the pixel coded by the palette coding unit 310 and the escape coding unit 312 and generates a reproduced pixel value.

The prediction error generating unit 313 determines a prediction mode in units of blocks and generates a prediction error on the basis of the determined prediction mode. The prediction error generating unit 313 outputs, in addition to the determined prediction mode, information such as an intra prediction mode and a motion vector to a pixel predicting and reconstructing unit 314 and the entropy coding unit 317. On the basis of the information such as a prediction mode and a motion vector output from the prediction error generating unit 313, the pixel predicting and reconstructing unit 314 obtains the pixel value stored in the picture memory 315 as a predicted value (a reference value that is referred to in prediction processing). Subsequently, the pixel predicting and reconstructing unit 314 adds the prediction error generated by the prediction error generating unit 313 and the prediction value obtained from the picture memory 315 to generate a reproduced pixel value.

The picture memory 315 stores the reproduced pixel value generated by the pixel reconstructing unit 319 and the reproduced pixel value generated by the pixel predicting and reconstructing unit 314.

The header coding unit 316 codes header information such as a sequence header, a picture header, and a slice header. The entropy coding unit 317 codes a code in units of blocks. The combining unit 318 combines the coded data generated by the header coding unit 316 and the coded data generated by the entropy coding unit 317 to generate a bit stream and outputs the bit stream to the outside of the image coding apparatus 300.

Next, a description will be given of image coding processing performed in the image coding apparatus 300 according to this embodiment with reference to FIGS. 4A and 4B. FIGS. 4A and 4B include a flowchart illustrating a procedure of the image coding processing performed in the image coding apparatus 300 according to this embodiment. The processing of the flowchart illustrated in FIGS. 4A and 4B is started after startup of the image coding apparatus 300 has been completed and image data of a moving image to be coded has been determined.

In step S401, the setting unit 303 determines, as the specifications of coding, information such the size of the image and a maximum block size, and outputs the determined information to the header coding unit 316. Also, in step S401, the setting unit 303 determines whether or not there is a possibility of using palette coding for a moving image sequence input to the image coding apparatus 300. Subsequently, the setting unit 303 sets a value of a palette_mode_enabled_flag code on the basis of the determination result. In this embodiment, the setting unit 303 sets the value of the palette_mode_enabled_flag code to 1 if there is a possibility of using palette coding. On the other hand, if there is not a possibility of using palette coding, the setting unit 303 sets the value of the palette_mode_enabled_flag code to 0.

Also, in step S401, the setting unit 303 determines whether or not to update a quantization parameter in units of blocks (whether or not update is possible), and sets a value of a cu_qp_delta_enabled_flag code on the basis of the determination result. In this embodiment, the setting unit 303 sets the value of the cu_qp_delta_enabled_flag code to 1 if the quantization parameter is to be updated and sets the value of the cu_qp_delta_enabled_flag code to 0 if the quantization parameter is not to be updated. Further, in step S401, the setting unit 301 determines whether or not to perform bypass processing, in which orthogonal transform and quantization are not performed, and sets a value of a transquant_bypass_enabled_flag code on the basis of the determination result. In this embodiment, the setting unit 303 sets the value of the transquant_bypass_enabled_flag code to 1 if there is a possibility of using bypass processing. On the other hand, if there is no possibility of using bypass processing, the setting unit 303 sets the value of the transquant_bypass_enabled_flag code to 0.

In step S402, the header coding unit 316 codes SPS, which is header information representing the specifications of the moving image sequence. Specifically, in this embodiment, the header coding unit 316 codes SPS including information representing the size of the image, a maximum block size, and so forth. Further, the header coding unit 316 codes, as the code of SPS, the palette_mode_enabled_flag code generated by the setting unit 303 in step S401.

In step S403, the header coding unit 316 codes PPS representing the specifications of the individual pictures of the moving image. In this embodiment, PPS includes information indicating whether or not a quantization parameter is updatable in units of blocks and information representing a possibility that bypass processing is performed. That is, in step S403, the header coding unit 316 codes the cu_qp_delta_enabled_flag code and the transquant_bypass_enabled_flag code generated by the setting unit 303 in step S401.

In steps S401 and S402 in this embodiment, the header coding unit 316 inputs coded data regarding header information, which is a result of coding, to the combining unit 318.

In step S404, the image coding apparatus 300 starts a loop of coding the moving image in units of pictures. From step S404 through step S428, the image coding apparatus 300 performs processing within the pictures and codes all the pictures included in the moving image sequence.

In step S405, the image coding apparatus 300 starts a loop of coding a target picture to be coded in units of slices. From step S405 through step S427, the image coding apparatus 300 performs processing within the slices and codes all the slices included in the target picture to be coded.

In step S406, the header coding unit 316 codes a slice header, which is header information representing the specifications of a slice of the moving image. In this embodiment, the slice header includes a slice_qp_delta code representing an initial value of the quantization parameter QP used for quantizing individual blocks. The header coding unit 316 outputs the coded data of the slice header including the slice_qp_delta code to the combining unit 318.

The slice_qp_delta code is generated by the QP setting and updating unit 308 on the basis of the initial value of the quantization parameter determined by the rate control unit 307. In this embodiment, the rate control unit 307 determines, prior to coding, the initial value of the quantization parameter QP so as to obtain a target bit rate. Further, the rate control unit 307 outputs the initial value of the quantization parameter QP to the QP setting and updating unit 308, the QP correcting unit 311, and the prediction error generating unit 313. The initial value of the quantization parameter QP determined by the rate control unit 307 is held by the QP memory 309.

In step S407, the image coding apparatus 300 starts a loop of coding a target slice to be coded in units of blocks. From step S407 through step S426, the image coding apparatus 300 performs processing within blocks and codes all the blocks included in the target slice to be coded. The block dividing unit 302 obtains image data of blocks to be coded in the scanning order from the picture buffer 301 and outputs the image data to the palette determining unit 304 and the selector 305.

In step S408, the palette determining unit 304 determines whether or not palette coding is to be performed on the image data of the target block to be coded output from the block dividing unit 302. Here, the palette determining unit 304 determines whether or not palette coding is to be performed on the image data of the target block to be coded on the basis of the value of the palette_mode_enabled_flag code output from the setting unit 303. That is, if the value of the palette_mode_enabled_flag code is 0, the palette determining unit 304 does not perform determination of whether or not palette coding is to be performed. In this case, the palette determining unit 304 sets 0 to the palette_mode_flag code and outputs it to the processing unit in the subsequent stage. On the other hand, if the value of the palette_mode_enabled_flag code is 1, the palette determining unit 304 determines whether or not palette coding is to be performed. In this embodiment, the palette determining unit 304 is capable of determining whether or not to perform palette coding on the basis of a feature quantity such as a distribution of pixel values in the block. The palette determining unit 304 outputs the determination result in the form of a palette_mode_flag code to the QP setting and updating unit 308, the QP correcting unit 311, and the prediction error generating unit 313. In this embodiment, the palette determining unit 304 sets the value of the palette_mode_flag code to 1 in the case of performing palette coding on the target block to be coded. On the other hand, the palette determining unit 304 sets the value of the palette_mode_flag code to 0 in the case of not performing palette coding on the target block to be coded.

In step S409, the rate control unit 307 determines, on the basis of the amount of coded data generated by the combining unit 318, a quantization parameter QP for controlling the rate of the coded data. For example, if the amount of coded data is larger than a certain upper limit value, the rate control unit 307 updates (changes) the value of the quantization parameter QP to become larger than the value of the previous quantization parameter. On the other hand, if the amount of coded data is smaller than a certain lower limit value (or equal to or smaller than the lower limit value), the rate control unit 307 updates (changes) the value of the quantization parameter QP to become smaller than the value of the previous quantization parameter. If the amount of coded data is an appropriate amount (equal to or larger than the certain lower limit value and equal to or smaller than the certain upper limit value), the rate control unit 307 may determine the previous quantization parameter as the quantization parameter QP without updating the quantization parameter.

In step S410, the QP setting and updating unit 308 determines, on the basis of the quantization parameter QP determined by the rate control unit 307 in step S409, whether or not the quantization parameter QP has been updated (changed) from the quantization parameter QP_prev of the previous block. If it is determined in step S410 that the quantization parameter QP has been updated, the processing proceeds to step S411. If it is determined in step S410 that the quantization parameter QP has not been updated, the processing proceeds to step S412.

In step S411, the QP setting and updating unit 308 obtains (refers to) the quantization parameter QP_prev that is stored in the QP memory 309 and that has been used for the previous block. Subsequently, the QP setting and updating unit 308 calculates a difference value between the obtained quantization parameter QP_prev and the quantization parameter QP determined (updated) by the rate control unit 307. Further, the QP setting and updating unit 308 outputs the calculated difference value to the entropy coding unit 317 in the form of a cu_qp_delta_abs code and a cu_qp_delta_sign_flag code. Also, the QP setting and updating unit 308 outputs the quantization parameter QP determined by the rate control unit 307 to the QP memory 309, and the QP memory 309 stores the quantization parameter QP output from the QP setting and updating unit 308.

Here, the QP setting and updating unit 308 may use, as the quantization parameter QP_prev, the quantization parameter used for quantizing the block that is coded just before the target block to be coded. Instead of the quantization parameter QP_prev of the block coded just before the target block, a value generated on the basis of quantization parameters used for quantizing a plurality of coded blocks may be used as the quantization parameter QP_prev. That is, among the plurality of quantization parameters stored in the QP memory 309, an average value of quantization parameters of the block located on the left of the target block and the block located above the target block in the target picture to be coded may be used as the quantization parameter QP_prev.

In step S412, the selector 305 determines whether or not palette coding is to be performed on the target block to be coded. Specifically, the selector 305 determines, on the basis of the value of the palette_mode_flag code determined by the palette determining unit 304 in step S408, whether the target block to be coded is a palette-coding block or a non-palette-coding block. If it is determined in step S412 that the target block to be coded is a palette-coding block (if the value of the palette_mode_flag code is 1), the processing proceeds to step S413. In this case (if the target block to be coded is a palette-coding block), the selector 305 outputs the image data of the target block to be coded to the pixel determining unit 306. On the other hand, if it is determined in step S412 that the target block to be coded is a non-palette-coding block (if the value of the palette_mode_flag code is 0), the processing proceeds to step S421. In this case (if the target block to be coded is a non-palette-coding block), the selector 305 outputs the image data of the target block to be coded to the prediction error generating unit 313.

Now, a description will be given of processing that is performed if the target block to be coded is a palette-coding block (if the value of the palette_mode_flag code is 1 in step S412).

In step S413, the QP correcting unit 311 obtains the quantization parameter QP determined by the rate control unit 307 in step S409. Subsequently, the QP correcting unit 311 corrects the obtained quantization parameter QP and calculates a corrected value QPp of the quantization parameter. Subsequently, the QP correcting unit 311 outputs the calculated corrected value QPp of the quantization parameter to the escape coding unit 312. That is, the corrected value QPp of the quantization parameter calculated by the QP correcting unit 311 in step S413 is used for quantization in the case of escape-coding the target block to be coded by the escape coding unit 312. In this embodiment, the QP correcting unit 311 uses Equation (1) according to the first embodiment as a method for calculating (correcting) the corrected value QPp of the quantization parameter. The method for calculating the corrected value QPp of the quantization parameter is not limited thereto. Equation (2) or Equation (3) according to the first embodiment may be used, or another method may be used.

In step S414, the entropy coding unit 317 codes the value of the palette_mode_flag code set by the palette determining unit 304 in step S408. Here, the target block to be coded is a palette-coding block on which palette coding is to be performed, and thus the value of the palette_mode_flag code set by the palette determining unit 304 is 1.

In step S415, the image coding apparatus 300 starts a loop of performing coding in units of pixels. From step S415 through step S420, the image coding apparatus 300 performs processing in units of pixels in the target block to be coded and codes all the pixels included in the target block to be coded.

In step S416, the pixel determining unit 306 determines whether palette coding or escape coding is to be performed on the target pixel to be coded. In this embodiment, the pixel determining unit 306 determines whether or not the color of the target pixel to be coded matches a color included in the palette table, and determines whether palette coding or escape coding is to be performed on the target pixel to be coded on the basis of the determination result. If there is a color that matches the color of the target pixel among the colors registered in the palette table in step S416, the pixel determining unit 306 determines that palette coding is to be performed on the target pixel to be coded (NO in step S416), and the processing proceeds to step S417. On the other hand, if there is not a color that matches the color of the target pixel among the colors registered in the palette table in step S416, the pixel determining unit 306 determines that escape coding is to be performed on the target pixel to be coded (YES in step S416), and the processing proceeds to step S418. In this embodiment, the pixel determining unit 306 determines to perform palette coding on the target pixel only if the pixel value of the target pixel to be coded completely matches the pixel value of a color included in the palette table, and otherwise determines to perform escape coding. However, the method for determining which of escape coding and palette coding is to be performed on the target pixel to be coded is not limited thereto. For example, the pixel determining unit 306 may use a method of performing palette coding on the target pixel to be coded if the pixel value of the target pixel to be coded is very close (not equal) to the pixel value of one of the colors included in the palette table. In this way, with use of palette coding in a case where the pixel value of the target pixel to be coded is close to the pixel value of a color included in the palette table, the amount of code may be decreased compared to the case of using escape coding.

In step S417, the palette coding unit 310 performs palette coding on the target pixel to be coded. Specifically, the palette coding unit 310 determines an index indicating a color corresponding to the target pixel to be coded by using the palette table, and outputs the determined index in the form of a palette_index code to the entropy coding unit 317. Further, in step S417, the entropy coding unit 317 performs entropy coding on the palette_index code output from the palette coding unit 310 to generate coded data of the pixel. The entropy coding unit 317 outputs the generated coded data of the pixel to the combining unit 318. Also, in step S417, the pixel reconstructing unit 319 receives, from the palette coding unit 310, the coded data of the target pixel generated by the palette coding unit 310, and locally decodes (reconstructs) the coded data. Then, the reconstructed pixel value is stored at an adaptive position in the block including the target pixel to be coded.

In step S418, the escape coding unit 312 performs escape coding on the target pixel to be coded. Specifically, the escape coding unit 312 outputs, to the entropy coding unit 317, an index indicating escape coding in the palette table in the form of a palette_index code. Further, in step S418, the entropy coding unit 317 performs entropy coding on the palette_index code output from the escape coding unit 312 to generate coded data of the pixel. The entropy coding unit 317 outputs the generated coded data of the pixel to the combining unit 318.

In step S419, the escape coding unit 312 quantizes the target pixel to be coded by using the corrected value QPp of the quantization parameter generated by the QP correcting unit 311 in step S413. Specifically, the escape coding unit 312 calculates a quantization step on the basis of the corrected value QPp of the quantization parameter, quantizes the target pixel to be coded by using the calculated quantization step, and generates a palette_escape_val code which is a quantized pixel value. Further, the entropy coding unit 317 performs entropy coding on the palette_escape_val code generated by the escape coding unit 312 to generate coded data of the pixel. The entropy coding unit 317 outputs the generated coded data of the pixel to the combining unit 318.

Also, in step S419, the pixel reconstructing unit 319 receives, from the escape coding unit 312, the corrected value QPp of the quantization parameter used for quantizing the target pixel to be coded and the quantized pixel value. Subsequently, the pixel reconstructing unit 319 calculates a quantization step on the basis of the corrected value QPp of the quantization parameter input thereto, dequantizes the quantized pixel value by using the calculated quantization step, and reproduces (reconstructs) the pixel value of the target pixel to be coded. Then, the reconstructed pixel value is stored at an adaptive position in the block including the target pixel to be coded.

In step S420, the pixel determining unit 306 determines whether or not coding processing has been performed on all the pixels in the target block to be coded. If it is determined in step S420 that coding processing has been performed on all the pixels, the processing proceeds to step S426. On the other hand, if it is determined in step S420 that coding processing has not been performed on all the pixels, the processing returns to step S416, and the pixel coding apparatus 300 performs coding on the next pixel in the target block to be coded.

Next, a description will be given of processing that is performed if the target block to be coded is a non-palette-coding block (if the value of the palette_mode_flag code is 0 in step S412).

In step S421, the entropy coding unit 317 codes the value of the palette_mode_flag code set by the palette determining unit 304 in step S408. Here, the target block to be coded is a non-palette-coding block on which palette coding is not to be performed, and thus the value of the palette_mode_flag code set by the palette determining unit 304 is 0.

In step S422, the prediction error generating unit 313 determines the prediction method to be used for the target pixel. Specifically, the prediction error generating unit 313 refers to the locally decoded image data stored in the picture memory 315 and determines which of intra prediction and inter prediction is to be used for the target pixel to be coded. Information regarding the prediction method determined by the prediction error generating unit 313 is output to the processing unit in the subsequent stage. Here, the information regarding the prediction method is information representing a prediction coding mode (representing intra prediction or inter prediction), an intra prediction mode (representing DC, vertical, horizontal, plane, or the like), a motion vector, and so forth. The entropy coding unit 317 performs entropy coding on the information regarding the prediction method output from the prediction error generating unit 313.

In step S423, the prediction error generating unit 313 performs prediction processing on the target pixel to be coded by using the prediction method determined in step S422 and generates a prediction error.

In step S424, the prediction error generating unit 313 performs orthogonal transform on the prediction error generated in step S423 to calculate a transform coefficient. Further, the prediction error generating unit 313 quantizes the calculated transform coefficient by using the quantization step calculated on the basis of the quantization parameter QP input from the rate control unit 307, and thereby calculates a quantized transform coefficient. The prediction error generating unit 313 inputs the calculated quantized transform coefficient to the entropy coding unit 317.

In step S429, the pixel predicting and reconstructing unit 314 dequantizes the quantized transform coefficient calculated by the prediction error generating unit 313 in step S424 and reconstructs a prediction error. Here, the pixel predicting and reconstructing unit 314 dequantizes the quantized transform coefficient by using the quantization step calculated on the basis of the quantization parameter QP input from the rate control unit 307 to reconstruct the transform coefficient. Further, the pixel predicting and reconstructing unit 314 performs inverse orthogonal transform on the transform coefficient to reconstruct the prediction error. Also, the pixel predicting and reconstructing unit 314 performs prediction processing by using (referring to) the locally decoded pixel value (reconstructed pixel) stored in the picture memory 315 on the basis of the information regarding the prediction method output from the prediction error generating unit 313, and thereby generates predicted image data. The image predicting and reconstructing unit 314 adds the predicted image data generated in this step and the reconstructed prediction error to reproduce pixel values in units of blocks. The pixel predicting and reconstructing unit 314 outputs the reproduced pixel values in units of blocks to the picture memory 315.

In step S425, the entropy coding unit 317 performs entropy coding on the quantized transform coefficient calculated by the prediction error generating unit 313 in step S424, and thereby generates coded data of the pixel. The entropy coding unit 317 outputs the generated coded data of the pixel to the combining unit 318. The combining unit 318 combines the coded data generated by the entropy coding unit 317 and the coded data generated by the header coding unit 316 to generate a bit stream and outputs the bit stream to the outside of the image coding apparatus 300.

In step S426, the entropy coding unit 317 determines whether or not coding has been performed on all the blocks in the target slice to be coded. If it is determined in step S426 that coding has been performed on all the blocks, the processing proceeds to step S427. On the other hand, if it is determined in step S426 that coding has not been performed on all the blocks, the processing returns to step S407, and the image coding apparatus 300 performs coding on the next block in the target slice to be coded.

In step S427, the entropy coding unit 317 determines whether or not coding has been performed on all the slices in the target picture to be coded. If it is determined in step S427 that coding has been performed on all the slices, the processing proceeds to step S428. On the other hand, if it is determined in step S427 that coding has not been performed on all the slices, the processing returns to step S405, and the image coding apparatus 300 performs coding on the next slice in the target picture to be coded.

In step S428, the block dividing unit 302 determines whether or not coding has been performed on all the pictures input to the image coding apparatus 300. If it is determined in step S428 that coding has been performed on all the pictures, the image coding apparatus 300 ends the image coding processing. On the other hand, if it is determined in step S428 that coding has not been performed on all the pictures, the processing returns to step S404, and the image coding apparatus 300 performs coding on the next picture.

As described above, with the configuration of the image coding apparatus 300 according to this embodiment and image coding processing performed thereby, quantization parameters are adaptively used for quantization of a prediction error in non-palette coding (prediction coding) and quantization of a pixel value in palette coding. That is, different quantization parameters may be used for a palette-coding block and a non-palette-coding block. In this way, the image coding apparatus 300 according to this embodiment is capable of performing coding processing by using quantization parameters that are respectively suitable for a palette-coding block and a non-palette-coding block. Thus, the image coding apparatus 300 according to this embodiment is capable of increasing coding efficiency compared to the case of using the same quantization parameter for both a palette-coding block and a non-palette-coding block.

In particular, regarding a palette-coding block, coding processing may be performed by considering a difference between a possible range of a bit depth and/or a pixel value of image data to be processed and a possible range of a prediction error.

Further, in this embodiment, the image coding apparatus 300 is capable of correcting a quantization parameter used for a non-palette-coding block to generate a quantization parameter used to quantize a palette-coding block. That is, a quantization parameter for a palette-coding block and a quantization parameter for a non-palette-coding block may be generated from one quantization parameter for a block. Thus, it is not necessary for the image coding apparatus 300 to insert a quantization parameter for a palette-coding block and a quantization parameter for a non-palette-coding block into a bit stream, and accordingly an increase in the amount of code may be suppressed.

In this embodiment, the image coding apparatus 300 simultaneously controls both quantization parameters for palette coding and non-palette coding by using one quantization parameter QP, but this embodiment is not limited thereto. That is, the image coding apparatus 300 may individually store quantization parameters in individual coding modes and may hold a quantization parameter before update on the basis of whether or not the target block to be processed is a palette-coding block at the time of update. In this way, the image coding apparatus 300 may store quantization parameters individually for palette coding and non-palette coding.

In this embodiment, a description has been given of a case where one quantization parameter QP is handled for one target block to be processed, but this embodiment is not limited thereto. For example, quantization parameters may be used independently for luminance and chrominance.

In this embodiment, a description has been given of an example in which the quantization parameter of the previous block is used as a reference value (predicted value) in the case of coding a difference in quantization parameter, but this embodiment is not limited thereto. For example, an average value of the quantization parameters of a block on the left of the target block and a block above the target block may be used as a reference value.

Third Embodiment

In the above-described first embodiment, dequantization is performed by performing correction in accordance with a target of quantization. In HEVC, a quantization parameter is coded so that the quantization step becomes 1 when the value of the quantization parameter is 4. The quantization parameter is designed so that the quantization step nonlinearly increases as the value of the quantization parameter increases. In HEVC, the quantization parameter may have a value of less than 4. In this case, the quantization step becomes 1 or less, and expression with an increased number of levels of gradation is possible. This is a technique of decreasing the number of colors in palette coding. It is useless to set the quantization step to 1 or less. Accordingly, in this embodiment, a description will be given of correction processing in a case where the quantization step is 1 or less.

The configuration illustrated in FIG. 1 according to the first embodiment may be applied to the image decoding apparatus according to this embodiment, and thus the description thereof is omitted here. Hereinafter, image decoding processing performed in the image decoding apparatus 100 according to this embodiment will be described with reference to FIGS. 5A and 5B. FIGS. 5A and 5B include a flowchart illustrating a procedure of the image decoding processing performed in the image decoding apparatus 100. In FIGS. 5A and 5B, the steps that implement the same functions as those of the steps illustrated in FIGS. 2A and 2B are denoted by the same reference numerals, and the description thereof is omitted.

Steps S201 to S207 are performed in the same manner as in the processing illustrated in FIGS. 2A and 2B according to the first embodiment. In step S202, the header decoding unit 102 decodes a cu_qp_delta_enabled_flag code indicating whether or not a quantization parameter is updatable in units of blocks. In this embodiment, if the value of the cu_qp_delta_enabled_flag code is 1, it indicates that a quantization parameter is updatable in units of blocks. On the other hand, if the value of the cu_qp_delta_enabled_flag code is 0, a cu_qp_delta_abs code and a cu_qp_delta_sign_flag code do not emerge in units of blocks. Therefore, this value indicates that a quantization parameter is not updated in units of blocks.

In step S202 of this embodiment, the header decoding unit 102 decodes a transquant_bypass_enabled_flag code representing a possibility that inverse orthogonal transform and/or dequantization is not performed in decoding of a block.

Now, the transquant_bypass_enabled_flag code according to this embodiment will be described. First, a description will be given of a case where the target block to be decoded is a non-palette-coding block. If the target block to be decoded is a non-palette-coding block and if the value of the transquant_bypass_enabled_flag code is 1, there is a possibility that the target block to be decoded is coded with orthogonal transform and quantization being omitted. Whether or not orthogonal transform and quantization are omitted for each block is represented by the cu_transquant_bypass_flag code for the block. If the value of the cu_transquant_bypass_flag code is 1, orthogonal transform and quantization are omitted. If the value is 0, orthogonal transform and quantization are not omitted. If the target block to be decoded is a non-palette-coding block and if the value of the transquant_bypass_enabled_flag code is 0, there is no possibility that the target block to be decoded is coded with orthogonal transform and quantization being omitted. In this case, it is assumed that the value of the cu_transquant_bypass_flag code is constantly 0.

Next, a description will be given of a case where the target block to be decoded is a palette-coding block. If the target block to be decoded is a palette-coding block, the transquant_bypass_enabled_flag code represents a possibility that quantization processing was omitted at the time of escape coding. That is, if the target block to be decoded is a palette-coding block and if the value of the transquant_bypass_enabled_flag code is 1, there is a possibility that quantization processing is omitted. On the other hand, if the target block to be decoded is a palette-coding block and if the value of the transquant_bypass_enabled_flag code is 0, it indicates that quantization processing is performed if escape coding is performed. The block for which quantization processing is omitted is represented by the cu_transquant_bypass_flag code for the block. If the value of the code is 1, quantization processing is omitted. If the value of the code is 0, quantization processing is not omitted.

In step S551, the entropy decoding unit 103 determines whether or not to perform dequantization and inverse orthogonal transform on the quantized transform coefficient of the target block to be decoded. In this embodiment, the entropy decoding unit 103 compares the value of the cu_transquant_bypass_flag code decoded in step S207 and thereby determines whether or not to perform dequantization and inverse orthogonal transform in decoding of the block.

That is, if the value of the cu_transquant_bypass_flag code is 1, the entropy decoding unit 103 determines not to perform dequantization and/or inverse orthogonal transform on the quantized transform coefficient of the block. That is, if it is determined in step S551 not to perform dequantization and/or inverse orthogonal transform, the image decoding apparatus 100 does not update the quantization parameter and the processing proceeds to step S210.

On the other hand, if the value of the cu_transquant_bypass_flag code is 0, the entropy decoding unit 103 determines to perform dequantization and inverse orthogonal transform on the quantized transform coefficient of the non-palette-coding block. If the value of the cu_transquant_bypass_flag code is 0, the entropy decoding unit 103 determines to perform dequantization in the palette-coding block. If it is determined to perform dequantization and/or inverse orthogonal transform, there is a possibility that a quantization parameter will be updated. That is, if it is determined in step S551 to perform dequantization and/or inverse orthogonal transform, the processing proceeds to step S208, and the image decoding apparatus 100 determines whether or not a quantization parameter is updated in the block to be decoded.

First, a description will be given of processing that is performed if the target block to be decoded is a palette-coding block (if the value of the palette_mode_flag code is 1 in step S210).

In step S211, as in step S211 according to the first embodiment, the QP correcting unit 109 corrects the quantization parameter QP input from the QP memory 107 via the QP decoding unit 106 by using Equation (1) and calculates a corrected value QPp of the quantization parameter.

In step S552, the QP correcting unit 109 compares the corrected value QPp of the quantization parameter calculated in step S211 with a predetermined certain value (threshold TH1). If the QP correcting unit 109 determines in step S522 that the corrected value QPp of the quantization parameter is smaller than the threshold TH1 (or equal to or smaller than the threshold TH1), the processing proceeds to step S553. On the other hand, if the QP correcting unit 109 determines in step S522 that the corrected value QPp of the quantization parameter is equal to or larger than the threshold TH1 (or larger than the threshold TH1), the processing proceeds to step S212. For example, in this embodiment, the threshold TH1 is 4, which is an upper limit value for causing the quantization step to be 1 or less.

In step S553, the QP correcting unit 109 further corrects the corrected value QPp of the quantization parameter corrected in step S211. In this embodiment, the QP correcting unit 109 adds a predetermined value PALETTE_QP_OFFSET to the corrected value QPp of the quantization parameter as expressed by Equation (4) and thereby corrects the quantization parameter. For example, the value of PALETTE_QP_OFFSET is 4 so that the corrected value QPp of the quantization parameter that has been corrected becomes 4 or more.

$$QPp=QPp+PALETTE\_QP\_OFFSET \quad (4)$$

With the above-described steps S552 and S553, the value of the quantization step may be set to 1 or more (the value of the quantization parameter may be set to 4 or more) in the case of coding a palette-coding block. That is, in palette coding, unnecessary code may be reduced if the value of the quantization step is less than 1.

If it is determined in step S214 that the target pixel to be decoded in the target block to be decoded is not palette-coded (NO in step S214), the processing proceeds to step S554. In step S554, the entropy decoding unit 103 determines whether or not to perform dequantization and inverse orthogonal transform on the prediction error of the block. That is, in step S554, if the value of the cu_transquant_bypass_flag code is 1, the decoded prediction error of the block is a difference value of the pixel value, and the entropy decoding unit 103 determines to perform dequantization and inverse orthogonal transform. In this case (if the value of the cu_transquant_bypass_flag code is 1), the processing proceeds to step S216. On the other hand, if the value of the cu_transquant_bypass_flag code is 0, the prediction error of the block is a quantized transform coefficient and the entropy decoding unit 103 determines in step S554 not to perform dequantization and inverse orthogonal transform. In this case (if the value of the cu_transquant_bypass_flag code is 0), the processing proceeds to step S555.

In step S555, the escape decoding unit 110 decodes the palette_escape_val code input from the palette decoding unit 105 in units of pixels and reconstructs the pixel value of the target pixel to be decoded in the target block to be decoded.

Next, a description will be given of processing that is performed if the target block to be decoded is a non-palette-coding block (if the value of the palette_mode_flag code is 0 in step S210).

In step S556, the entropy decoding unit 103 determines whether or not to skip dequantization and inverse orthogonal transform of the target block to be decoded. That is, in step S556, the entropy decoding unit 103 compares the decoded value of the cu_transquant_bypass_flag code. If the value of the cu_transquant_bypass_flag code is 1 in step S556, the entropy decoding unit 103 determines to skip dequantization and inverse orthogonal transform of the target block to be decoded, and the processing proceeds to step S220. If it is determined in step S556 to skip dequantization and inverse orthogonal transform, the quantized transform coefficient reproduced in step S218 is used as a prediction error of a pixel value in the following steps. On the other hand, if the value of the cu_transquant_bypass_flag code is 0 in step S556, the entropy decoding unit 103 determines to perform dequantization and inverse orthogonal transform of the target block to be decoded, and the processing proceeds to step S219. If it is determined in step S556 to perform dequantization and inverse orthogonal transform, the quantized transform coefficient reproduced in step S218 is used as a quantized transform coefficient in the following steps.

The syntax of coded data input to the image decoding apparatus 100 in this embodiment is given below. Table 1 shows a state of a cu_qp_delta_abs code and a cu_qp_delta_sign_flag code in the case of decoding a non-palette-coding block. Table 2 shows a state of a cu_qp_delta_abs code and a cu_qp_delta_sign_flag code in the case of decoding a palette-coding block. As shown in Tables 1 and 2, the syntax according to this embodiment includes a condition of a part described in italics in addition to the syntax in HEVC according to the related art.

TABLE 1

| | Descriptor |
|---|---|
| transform_unit(x0, y0, xBase, yBase, log2TrafoSize, trafoDepth, blkIdx ) { | |
|   log2TrafoSizeC = Max(2, log2TrafoSize − (ChromaArrayType = = 3?0: 1) ) | |
|   cbfDepthC = trafoDepth − (ChromaArrayType! = 3 && log2TrafoSize = = 2? 1:0) | |
|   xC = (ChromaArrayType! = 3 && log2TrafoSize = = 2) ? xBase: x0 | |
|   yC = (ChromaArrayType! = 3 && log2TrafoSize = = 2) ? yBase: y0 | |
|   cbfLuma = cbf_luma [x0] [y0] [trafoDepth] | |
|   cbfChroma = | |
|     cbf_cb [xC] [yC] [cbfDepthC]    \| | |
|     cbf_cr [xC] [yC] [cbfDepthC]    \| | |
|     (ChromaArrayType = = 2 && | |
|       (cbf_cb [xC] [yC + (1 << log2TrafoSizeC)] [cbfDepthC]    \| | |
|       cbf_cr [xC] [yC + (1 << log2TrafoSizeC)] [cbfDepthC])) | |
|   if (cbfLuma \|\| cbfChroma) { | |
|     if (cu_qp_delta_enabled_flag && !IsCuQpDeltaCoded && !cu_transquant_bypass_flag) { | |
|       cu_qp_delta_abs | ae (v) |
|       if (cu_qp_delta_abs) | |
|         cu_qp_delta_sign_flag | ae (v) |
|     } | |
|     if (cu_chroma_qp_offset_enabled_flag && cbfChoma && !cu_transquant_bypass_flag && !IsCuChromaQpOffsetCoded) { | |
|       cu_chroma_qp_offset_flag | ae (v) |

TABLE 1-continued

| | Descriptor |
|---|---|
|     if (cu_chroma_qp_offset_flag &&<br>chroma_qp_offset_list_len_minusI > 0)<br>        cu_chroma_qp_offset_idx<br>    }<br>    ... | ae (v) |

TABLE 2

| | Descriptor |
|---|---|
| palette_coding (x0, y0, nCbS) {<br>   ...<br>   palette_escape_val_present_flag<br>   if (palette_escape_val_present_flag) {<br>      if (cu_qp_delta_enabled_flag &&<br>            !IsCuQpDeltaCoded<br>            && !cu_transquant_bypass_flag) {<br>        cu_qp_delta_abs<br>        if (cu_qp_delta_abs)<br>           cu_qp_delta_sign_flag<br>      }<br>      if (cu_chroma_qp_offset_enabled_flag &&<br>      !IsCuChromaQpOffsetCoded) {<br>        cu_chroma_qp_offset_flag<br>        if (cu_chroma_qp_offset_flag &&<br>chroma_qp_offset_list_len_minusI> 0)<br>           cu_chroma_qp_offset_idx<br>      }<br>   }<br>if (palette_escape_val_present_flag) | <br><br>ae (v)<br><br><br><br><br>ae (v)<br><br>ae (v)<br><br><br><br>ae (v)<br><br><br>ae (v) |

As described above, with the configuration of the image decoding apparatus 100 according to this embodiment and image decoding processing performed thereby, quantization parameters are adaptively used for dequantization of a prediction error in non-palette coding (prediction coding) and dequantization of a pixel value in palette coding. That is, different quantization parameters may be used for a palette-coding block and a non-palette-coding block. In this way, the image decoding apparatus 100 according to this embodiment is capable of performing decoding processing by using quantization parameters that are respectively suitable for a palette-coding block and a non-palette-coding block. Thus, the image decoding apparatus 100 according to this embodiment is capable of increasing coding efficiency compared to the case of using the same quantization parameter for both a palette-coding block and a non-palette-coding block.

In particular, regarding a palette-coding block, decoding processing may be performed by considering a difference between a possible range of a bit depth and/or a pixel value of image data to be processed and a possible range of a prediction error.

Further, in this embodiment, the image decoding apparatus 100 is capable of correcting a quantization parameter used for a non-palette-coding block to generate a quantization parameter used to dequantize a palette-coding block. That is, a quantization parameter for a palette-coding block and a quantization parameter for a non-palette-coding block may be generated from one quantization parameter for a block. Thus, it is not necessary for a coding apparatus to insert a quantization parameter for a palette-coding block and a quantization parameter for a non-palette-coding block into a bit stream, and accordingly an increase in the amount of code may be suppressed.

In this embodiment, the image decoding apparatus 100 is capable of setting a quantization step to 1 or more. That is, the image decoding apparatus 100 is capable of setting the quantization parameter QP to 4 or more. For example, if the quantization parameter QP is less than 4, the target pixel value to be processed is dequantized by a quantization step of less than 1 in a palette-coding block. In this way, with dequantization being performed by using a quantization step of 1 or more, the image decoding apparatus 100 is capable of preventing a useless increase in the amount of coded data to be processed.

In this embodiment, the image decoding apparatus 100 updates a quantization parameter for only a block to be dequantized and is thereby capable of preventing update of a quantization parameter for a block not to be dequantized. Accordingly, the image decoding apparatus 100 is capable of preventing unintended update of a quantization parameter, and is capable of updating a quantization parameter only when image quality is to be controlled.

In this embodiment, PALETTE_QP_OFFSET is added to correct a quantization parameter QP that is smaller than the predetermined threshold TH1, but this embodiment is not limited thereto. The value of the quantization parameter QP for palette coding may be limited to 4 or more. For example, limitation may be given in which, if the value of the palette_mode_enabled_flag code is 1, it is prohibited that the quantization parameter of a coded bit steam is less than 4.

Further, the image decoding apparatus 100 may correct the quantization parameter QP by replacing the value of the quantization parameter QP that is smaller than the predetermined threshold TH1 by 4. That is, the quantization parameter QP may be corrected by using Equation (5).

$$\text{if (QPp is equal to or smaller than 3)QPp=4} \quad (5)$$

In this embodiment, a description has been given of a case where one quantization parameter QP is handled for one target block to be processed, but this embodiment is not limited thereto. For example, quantization parameters may be used independently for luminance and chrominance.

In this embodiment, a description has been given of an example in which the quantization parameter of the previous block is used as a reference value (predicted value) in the case of coding a difference in quantization parameter, but this embodiment is not limited thereto. For example, an average value of the quantization parameters of a block on the left of the target block and a block above the target block may be used as a reference value.

Fourth Embodiment

In the above-described second embodiment, dequantization is performed by performing correction in accordance with a target of quantization. In HEVC, a quantization parameter is coded so that the quantization step becomes 1 when the value of the quantization parameter is 4. The quantization parameter is designed so that the quantization step nonlinearly increases as the value of the quantization parameter increases. In HEVC, the quantization parameter may have a value of less than 4. In this case, the quantization step becomes 1 or less, and expression with an increased number of levels of gradation is possible. This is a technique of decreasing the number of colors in palette coding. It is useless to set the quantization step to 1 or less. Accordingly, in this embodiment, a description will be given of correction processing in a case where the quantization step is 1 or less. The configuration illustrated in FIG. 3 according to the second embodiment may be applied to the image coding apparatus according to this embodiment, and thus the description thereof is omitted here. Hereinafter, image coding processing performed in the image coding apparatus 300 according to this embodiment will be described with reference to FIGS. 6A and 6B. FIGS. 6A and 6B include a flowchart illustrating a procedure of the image coding processing performed in the image coding apparatus 300. In FIGS. 6A and 6B, the steps that implement the same functions as those of the steps illustrated in FIGS. 4A and 4B are denoted by the same reference numerals, and the description thereof is omitted.

Steps S401 to S407 are performed in the same manner as in the processing illustrated in FIGS. 4A and 4B according to the second embodiment.

In step S651, the palette determining unit 304 determines whether or not palette coding is to be performed on the image data of a block output from the block dividing unit 302, as in step S408. Also, in step S651, the prediction error generating unit 313 determines whether or not orthogonal transform and quantization are to be performed (whether or not coding is performed in a lossless manner) on the image data of the block. In this embodiment, the prediction error generating unit 313 determines to perform lossless coding if it is necessary to transmit an image without partial deterioration. For example, the prediction error generating unit 313 may obtain information regarding a region (block) to be lossless-coded set by a processing unit (not illustrated) outside the image coding apparatus 300 and may determine whether or not to perform lossless coding. If the prediction error generating unit 313 determines in step S651 to perform lossless coding, the prediction error generating unit 313 sets the value of the cu_transquant_bypass_flag code to 1. On the other hand, if the prediction error generating unit 313 determines in step S651 not to perform lossless coding, the prediction error generating unit 313 sets the value of the cu_transquant_bypass_flag code to 0.

In step S652, the entropy coding unit 317 performs determination on the basis of the value of the cu_transquant_bypass_flag code set by the prediction error generating unit 313 in step S651. If the value of the cu_transquant_bypass_flag code is 1 in step S652, the processing proceeds to step S412. On the other hand, if the value of the cu_transquant_bypass_flag code is 0 in step S652, the processing proceeds to step S410. That is, if the value of the cu_transquant_bypass_flag code is 1, the image coding apparatus 300 does not perform the coding regarding update of a quantization parameter in steps S410 and S411. With this processing, the image coding apparatus 300 according to this embodiment is capable of generating the code of the syntax shown in Tables 1 and 2 according to the third embodiment.

Hereinafter, a description will be given of processing that is performed if it is determined in step S412 that the target block to be coded is a palette-coding block. In step S413, the QP correcting unit 311 calculates a corrected value QPp of the quantization parameter that is corrected to be used for dequantization at the time of escape coding, as in the second embodiment.

In step S653, the QP correcting unit 311 compares the corrected value QPp of the quantization parameter calculated in step S413 with a predetermined certain value (threshold TH1). For example, in this embodiment, it is assumed that the threshold TH1 is 4, which is an upper limit value for causing the quantization step to be 1 or less. If the QP correcting unit 311 determines in step S653 that the corrected value QPp of the quantization parameter is smaller than the threshold TH1, the processing proceeds to step S654. If the QP correcting unit 311 determines in step S653 that the corrected value QPp of the quantization parameter is equal to or larger than the threshold TH1, the processing proceeds to step S414.

In step S654, the QP correcting unit 311 further corrects the corrected value QPp of the quantization parameter corrected in step S413. In this embodiment, the QP correcting unit 311 adds a predetermined value PALETTE_QP_OFFSET to the corrected value QPp of the quantization parameter as expressed by Equation (4) according to the third embodiment, and thereby corrects the quantization parameter.

In step S655, the entropy coding unit 317 performs determination on the basis of the value of the cu_transquant_bypass_flag code set by the prediction error generating unit 313 in step S651. In step S655, if the value of the cu_transquant_bypass_flag code is 1, the processing proceeds to step S656. On the other hand, if the value of the cu_transquant_bypass_flag code is 0, the processing proceeds to step S419.

In step S656, the escape coding unit 312 sets the input pixel value to be coded to the palette_escape_val code. The entropy coding unit 317 performs entropy coding on the palette_escape_val code input from the escape coding unit 312. Also, in step S656, the pixel reconstructing unit 319 receives the pixel value of the target pixel to be coded from the escape coding unit 312 and stores the input pixel value at an adaptive position in the block including the target pixel to be coded.

Next, a description will be given of processing that is performed if it is determined in step S412 that the target block to be coded is a non-palette-coding block.

In step S657, the entropy coding unit 317 performs determination on the basis of the value of the cu_transquant_bypass_flag code set by the prediction error generating unit 313 in step S651. If the value of the cu_transquant_bypass_flag code is 1 in step S657, the processing proceeds to step S425. In this case, orthogonal transform and quantization are not performed, and thus the prediction error generated in step S423 is a prediction error of a pixel value. On the other hand, if the value of the cu_transquant_bypass_flag code is 0 in step S657, the processing proceeds to step S424. In this case, orthogonal transform and quantization are performed, and thus the prediction error calculated in step S424 is a quantized transform coefficient.

As described above, with the configuration of the image coding apparatus 300 according to this embodiment and image coding processing performed thereby, quantization parameters are adaptively used for quantization of a prediction error in non-palette coding (prediction coding) and quantization of a pixel value in palette coding. That is, different quantization parameters may be used for a palette-coding block and a non-palette-coding block. In this way, the image coding apparatus 300 according to this embodiment is capable of performing coding processing by using quantization parameters that are respectively suitable for a palette-coding block and a non-palette-coding block. Thus, the image coding apparatus 300 according to this embodiment is capable of increasing coding efficiency compared to the case of using the same quantization parameter for both a palette-coding block and a non-palette-coding block.

In particular, regarding a palette-coding block, coding processing may be performed by considering a difference between a possible range of a bit depth and/or a pixel value of image data to be processed and a possible range of a prediction error.

Further, in this embodiment, the image coding apparatus 300 is capable of correcting a quantization parameter used for a non-palette-coding block to generate a quantization parameter used to quantize a palette-coding block. That is, a quantization parameter for a palette-coding block and a quantization parameter for a non-palette-coding block may be generated from one quantization parameter for a block. Thus, it is not necessary for the image coding apparatus 300 to insert a quantization parameter for a palette-coding block and a quantization parameter for a non-palette-coding block into a bit stream, and accordingly an increase in the amount of code may be suppressed.

In this embodiment, the image coding apparatus 300 is capable of setting a quantization step to 1 or more. That is, the image coding apparatus 300 is capable of setting the quantization parameter QP to 4 or more. For example, if the quantization parameter QP is less than 4, the target pixel value to be processed is quantized by a quantization step of less than 1 in a palette-coding block. In this way, with quantization being performed by using a quantization step of 1 or more, the image coding apparatus 100 is capable of preventing a useless increase in the amount of coded data to be processed.

In this embodiment, the image coding apparatus 300 updates a quantization parameter for only a block to be quantized and is thereby capable of preventing update of a quantization parameter for a block not to be quantized. Accordingly, the image coding apparatus 300 is capable of preventing unintended update of a quantization parameter, and is capable of updating a quantization parameter only when image quality is to be controlled. In this embodiment, the image coding apparatus 300 simultaneously controls both quantization parameters for a palette coding and non-palette coding by using one quantization parameter QP, but this embodiment is not limited thereto. That is, the image coding apparatus 300 may individually store quantization parameters in individual coding modes and may hold quantization parameters that not been updated on the basis of whether or not the target block to be processed is a palette-coding block at the time of update. In this way, the image coding apparatus 300 may store quantization parameters for palette coding and non-palette coding.

In this embodiment, a description has been given of a case where one quantization parameter QP is handled for one target block to be processed, but this embodiment is not limited thereto. For example, quantization parameters may be used independently for luminance and chrominance.

In this embodiment, a description has been given of an example in which the quantization parameter of the previous block is used as a reference value (predicted value) in the case of coding a difference in quantization parameter, but this embodiment is not limited thereto. For example, an average value of the quantization parameters of a block on the left of the target block and a block above the target block may be used as a reference value.

In this embodiment, PALETTE_QP_OFFSET is added to correct the quantization parameter QP that is smaller than the predetermined threshold TH1, but this embodiment is not limited thereto. The value of the quantization parameter QP for palette coding may be limited to 4 or more. For example, limitation may be given in which, if the value of the palette_mode_enabled_flag code is 1, it is prohibited that the quantization parameter of a coded bit steam is less than 4.

Further, the image coding apparatus 300 may correct the quantization parameter QP by replacing the value of the quantization parameter QP that is smaller than the predetermined threshold TH1 by 4. That is, the quantization parameter QP may be corrected by using Equation (5) according to the third embodiment.

Fifth Embodiment

The individual processing units illustrated in FIGS. 1 and 3 have been described as being constituted by hardware. Alternatively, the processing operations performed by the individual processing units illustrated in these figures may be implemented by a computer program. Hereinafter, a fifth embodiment will be described with reference to FIG. 7. FIG. 7 is a block diagram illustrating an example of the hardware configuration of a computer applicable to the image coding apparatus and/or the image decoding apparatus according to the above-described embodiments.

A central processing unit (CPU) 701 controls the overall computer by using a computer program and data stored in a random access memory (RAM) 702 and a read only memory (ROM) 703, and executes the above-described processing operations that are performed by the image coding apparatus and/or the image decoding apparatus according to the above-described embodiments. That is, the CPU 701 functions as the individual processing units illustrated in FIGS. 1 and 3.

The RAM 702 has an area for temporarily storing a computer program and data that have been loaded from an external storage device 706 and data obtained from the outside via an interface (I/F) 707. Further, the RAM 702 has a working area used by the CPU 701 to execute various processing operations. That is, the RAM 702 is capable of, for example, being assigned as a picture memory or providing other various areas if necessary.

The ROM 703 stores setting data for the computer and a boot program. An operation unit 704 is constituted by a keyboard, a mouse, and the like, and is capable of inputting various instructions to the CPU 701 when being operated by a user of the computer. A display unit 705 displays a decoding result generated by the CPU 701. The display unit 705 is constituted by, for example, a liquid crystal display.

The external storage device 706 is a large-capacity information storage device represented by a hard disk drive device. The external storage device 706 sores an operating system (OS) and a computer program that causes the CPU 701 to implement the functions of the individual units illustrated in FIGS. 1 and 3. Further, the external storage device 706 may store pieces of image data as processing targets.

The computer program and data stored in the external storage device 706 are loaded to the RAM 702 if necessary in accordance with control performed by the CPU 701 and become a target to be processed by the CPU 701. A network, such as a local area network (LAN) or the Internet, and another device, such as a projection device or a display device, may be connected to the I/F 707. The computer is capable of obtaining or transmitting various information via the I/F 707. A bus 708 connects the above-described units to one another.

The operations performed by the above-described units are controlled, as the operations illustrated in the above-described flowcharts, mainly by the CPU 701.

Other Embodiments

In each of the above-described embodiments, the value of each code is not limited to 0 or 1. For example, in each of the above-described embodiments, palette coding is used for the target block to be processed if the value of the palette_mode_flag code is 1. Alternatively, palette coding may be used if the value of the palette_mode_flag code is 0. The same applies to the other codes.

In each of the above-described embodiments, whether or not processing on pictures, slices, and blocks has been completed is determined by the corresponding processing unit of the image decoding apparatus 100 or the image coding apparatus 300, but an embodiment of the present invention is not limited thereto. That is, the determination may be made by another processing unit of the image decoding apparatus 100 or the image coding apparatus 300, or by an overall control unit (not illustrated) of the image decoding apparatus 100 or the image coding apparatus 300. Further, the determination may be made by a processing unit outside the image decoding apparatus 100 or the image coding apparatus 300.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments.

The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) registered trademark), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242441, filed Nov. 28, 2014, which is hereby incorporated by reference herein in its entirety.

The invention claimed is:

1. An image decoding apparatus that decodes a bit stream generated by coding an image, comprising:
a first determining unit configured to determine whether a target block to be decoded is palette-coded in the bit stream using palette-coding;
a second determining unit configured to determine whether or not a pixel in the target block is escape-coded in a case where the first determining unit determines that the target block is palette-coded; and
a decoding unit configured to obtain a first quantization parameter for a luminance component of the target block in accordance with information decoded from the bit stream,
wherein the information decoded from the bit stream indicates a difference between the first quantization parameter and a third quantization parameter for a luminance component,
wherein the third quantization parameter is a previous quantization parameter of the first quantization parameter or a quantization parameter based on the previous quantization parameter,
wherein the decoding unit is configured to obtain the first quantization parameter by adding the third quantization parameter and the difference,
wherein the decoding unit is configured to compare a threshold and a quantization parameter based on the first quantization parameter for the target block which is obtained by adding the third quantization parameter and the difference, and to determine, in accordance with a result of the comparison, a second quantization parameter so that the second quantization parameter is to be greater than or equal to 4 which corresponds to a case where a quantization step is 1,
wherein the second quantization parameter is for the target block in which the first determining unit determines that the target block is palette-coded and the second determining unit determines that the pixel in the target block is escape-coded, and
wherein the decoding unit is configured to decode coded data corresponding to a quantized pixel value of the pixel in the target block to obtain the quantized pixel value of the pixel, and to perform inverse-quantization processing on the quantized pixel value by using the second quantization parameter, in a case where the first determining unit determines that the target block is palette-coded and the second determining unit determines that the pixel in the target block is escape-coded.

2. The image decoding apparatus according to claim 1, wherein the decoding unit is configured to, in a case where the second determining unit determines that the pixel in the target block is not escape-coded, decode a pixel value of the pixel in the target block by decoding data representing an index of a palette that has been used for palette coding.

3. The image decoding apparatus according to claim 2, wherein, in a case where the second determining unit determines that the pixel in the target block is escape-coded, the decoding unit decodes the pixel value of the pixel in the target block without using the palette.

4. The image decoding apparatus according to claim 1, wherein the second quantization parameter is determined by shifting the first quantization parameter in accordance with a difference between a possible range of a bit depth and/or a pixel value of the coded data corresponding to the target block and a possible range of a predication error.

5. The image decoding apparatus according to claim 1, wherein the second quantization parameter is determined by shifting the first quantization parameter so as to make a quantization step 1 or more.

6. The image decoding apparatus according to claim 1, further comprising:
a third determining unit configured to determine whether or not the target block is quantized or inverse-quantized,
wherein the first quantization parameter is not coded or decoded in a case where the second determining unit determines that the pixel in the target block is escape-coded and the third determining unit determines that the target block is not quantized or inverse-quantized.

7. An image coding apparatus that codes a target block to be coded in an image into a bit stream, comprising:
a first determining unit configured to determine whether the target block is to be palette-coded using palette-coding;
a second determining unit configured to determine whether or not a pixel in the target block is to be escape-coded in a case where the first determining unit determines that the target block is to be palette-coded; and
a coding unit configured to perform quantization processing on a pixel value of the pixel in the target block by using a second quantization parameter, in a case where the target block is to be palette-coded and the pixel in the target block is to be escape-coded,
wherein the coding unit codes information for indicating a first quantization parameter different from the second quantization parameter even in a case of coding the target block by using the second quantization parameter,
wherein the information indicates a difference between the first quantization parameter and a third quantization parameter for luminance, and
wherein the third quantization parameter is a previous quantization parameter of the first quantization parameter or a quantization parameter based on the previous quantization parameter,
wherein the image coding apparatus further comprises a third determining unit configured to compare a threshold and a quantization parameter based on the first quantization parameter for the target block which is to be obtained by adding the third quantization parameter and the difference, and to determine, in accordance with a result of the comparison, the second quantization parameter so that the second quantization parameter is to be greater than or equal to 4 which corresponds to a case where a quantization step is 1, and
wherein the second quantization parameter is for the target block in which the first determining unit determines that the target block is to be palette-coded and the second determining unit determines that the pixel in the target block is to be escape-coded.

8. The image coding apparatus according to claim 7, wherein the coding unit is configured to, in a case where the second determining unit determines that the pixel in the target block is to be escape-coded, code a pixel value of the pixel in the target block by coding data representing an index of a palette that is used for palette coding.

9. The image coding apparatus according to claim 8, wherein, in a case where the second determining unit determines that the pixel in the target block is to be escape-coded, the coding unit codes the pixel value of the pixel in the target block without using the palette.

10. The image coding apparatus according to claim 7, wherein the second quantization parameter is determined by shifting the first quantization parameter in accordance with a difference between a possible range of a bit depth and/or a pixel value of the target block and a possible range of a prediction error.

11. The image coding apparatus according to claim 7, wherein the second quantization parameter is determined by shifting the first quantization parameter so as to make a quantization step 1 or more.

12. The image coding apparatus according to claim 7, further comprising:
a third determining unit configured to determine whether or not the target block is to be quantized,
wherein the first quantization parameter is not coded, in a case where the second determining unit determines that the pixel in the target block is to be escape-coded and the third determining unit determines that the target block is to be quantized.

13. An image decoding method for decoding a bit stream generated by coding an image, comprising:
a first determining step of determining whether a target block to be decoded is palette-coded in the bit stream using palette-coding;
a second determining step of determining whether or not a pixel in the target block is escape-coded in a case where the first determining step determines that the target block is palette-coded; and
an obtaining step of obtaining a first quantization parameter for a luminance component of the target block in accordance with information decoded from the bit stream,
wherein the information decoded from the bit stream indicates a difference between the first quantization parameter and a third quantization parameter for a luminance component,
wherein the third quantization parameter is a previous quantization parameter of the first quantization parameter or a quantization parameter based on the previous quantization parameter,
wherein, in the obtaining step, the first quantization parameter is obtained by adding the third quantization parameter and the difference,
wherein the image decoding method further comprises a comparing step of comparing a threshold and a quantization parameter based on the first quantization parameter for the target block which is obtained by adding the third quantization parameter and the difference,
wherein the image decoding method further comprises a third determination step of determining, in accordance with a result of the comparison in the comparing step, a second quantization parameter so that the second quantization parameter is to be greater than or equal to 4 which corresponds to a case where a quantization step is 1,
wherein the second quantization parameter is for the target block in which it is determined in the first determining step that the target block is palette-coded and it is determined in the second determining step that the pixel in the target block is escape-coded, and
wherein coded data corresponding to a quantized pixel value of the pixel in the target block is decoded to obtain the quantized pixel value of the pixel, and inverse-quantization processing is performed on the quantized pixel value by using the second quantization parameter, in a case where it is determined in the first determining step that the target block is palette-coded and the second determining step determines that the pixel in the target block is escape-coded.

14. An image coding method for coding a target block to be coded in an image into a bit stream, comprising:
  a first determining step of determining whether the target block is to be palette-coded using palette-coding;
  a second determining step of determining whether or not a pixel in the target block is to be escape-coded in a case where the first determining step determines that the target block is to be palette-coded; and
  a performing step of performing quantization processing on a pixel value of the pixel in the target block by using a second quantization parameter, in a case where the target block is to be palette-coded and the pixel in the target block is to be escape-coded,
  wherein information for indicating a first quantization parameter different form the second quantization parameter is coded even in a case of coding the target block by using the second quantization parameter,
  wherein the information indicates a difference between the first quantization parameter and a third quantization parameter for luminance, and
  wherein the third quantization parameter is a previous quantization parameter of the first quantization parameter or a quantization parameter based on the previous quantization parameter, and
  wherein the image coding method further comprises a comparison step of comparing a threshold and a quantization parameter based on the first quantization parameter for the target block which is to be obtained by adding the third quantization parameter and the difference,
  wherein the image coding method further comprises a third determining step of determining, in accordance with a result of the comparison in the comparing step, the second quantization parameter so that the second quantization parameter is to be greater than or equal to 4 which corresponds to a case where a quantization step is 1,
  wherein the second quantization parameter is for the target block in which it is determined in the first determining step that the pixel in the target block is to be pallet-coded and it is determined in the second determining step that the pixel in the target block is escape-coded.

15. A non-transitory storage medium storing a program that causes a computer to execute an image decoding method for decoding a bit stream generated by coding an image, the method comprising:
  a first determining step of determining whether a target block to be decoded is palette-coded in the bit stream using palette-coding;
  a second determining step of determining whether or not a pixel in the target block is escape-coded in a case where the first determining step determines that the target block is palette-coded; and
  an obtaining step of obtaining a first quantization parameter for a luminance component of the target block in accordance with information decoded from the bit stream,
  wherein the information decoded from the bit stream indicates a difference between the first quantization parameter and a third quantization parameter for a luminance component,
  wherein the third quantization parameter is a previous quantization parameter of the first quantization parameter or a quantization parameter based on the previous quantization parameter,
  wherein, in the obtaining step, the first quantization parameter is obtained by adding the third quantization parameter and the difference,
  wherein the image decoding method further comprises a comparing step of comparing a threshold and a quantization parameter based on the first quantization parameter for the target block which is obtained by adding the third quantization parameter and the difference,
  wherein the image decoding method further comprises a third determination step of determining, in accordance with a result of the comparison in the comparing step, a second quantization parameter so that the second quantization parameter is to be greater than or equal to 4 which corresponds to a case where a quantization step is 1,
  wherein the second quantization parameter is for the target block in which it is determined in the first determining step that the target block is palette-coded and it is determined in the second determining step that the pixel in the target block is escape-coded, and
  wherein coded data corresponding to a quantized pixel value of the pixel in the target block is decoded to obtain the quantized pixel value of the pixel, and inverse-quantization processing is performed on the quantized pixel value by using the second quantization parameter, in a case where it is determined in the first determining step that the target block is palette-coded and the second determining step determines that the pixel in the target block is escape-coded.

16. A non-transitory storage medium storing a program that causes a computer to execute an image coding method for coding a target block to be coded in an image into a bit stream, the method comprising:
  a first determining step of determining whether the target block is to be palette-coded using palette-coding;
  a second determining step of determining whether or not a pixel in the target block is to be escape-coded in a case where the first determining step determines that the target block is to be palette-coded; and
  a performing step of performing quantization processing on a pixel value of the pixel in the target block by using a second quantization parameter, in a case where the target block is to be palette-coded and the pixel in the target block is to be escape-coded,
  wherein information for indicating a first quantization parameter different form the second quantization parameter is coded even in a case of coding the target block by using the second quantization parameter,
  wherein the information indicates a difference between the first quantization parameter and a third quantization parameter for luminance, and
  wherein the third quantization parameter is a previous quantization parameter of the first quantization parameter or a quantization parameter based on the previous quantization parameter, and
  wherein the image coding method further comprises a comparison step of comparing a threshold and a quantization parameter based on the first quantization parameter for the target block which is to be obtained by adding the third quantization parameter and the difference,
  wherein the image coding method further comprises a third determining step of determining, in accordance with a result of the comparison in the comparing step, the second quantization parameter so that the second quantization parameter is to be greater than or equal to 4 which corresponds to a case where a quantization step is 1, wherein the second quantization parameter is for the target block in which it is determined in the first determining step that the pixel in the target block is to be pallet-coded and it is determined in the second determining step that the pixel in the target block is escape-coded.

\* \* \* \* \*